(12) United States Patent
Gewickey et al.

(10) Patent No.: US 12,537,990 B2
(45) Date of Patent: Jan. 27, 2026

(54) HARDWARE FOR ENTERTAINMENT CONTENT IN VEHICLES

(71) Applicant: WARNER BROS. ENTERTAINMENT INC., Burbank, CA (US)

(72) Inventors: Gregory I. Gewickey, Carpinteria, CA (US); Ha Nguyen, Fullerton, CA (US); Rana Brahma, Los Angeles, CA (US); Prashant Abhyankar, Los Angeles, CA (US); Nicole Schoepf, Burbank, CA (US); Genevieve Morris, Burbank, CA (US); Michael Zink, Altadena, CA (US); Michael Smith, Hermosa Beach, CA (US); Gary Lake-Schaal, Los Angeles, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 388 days.

(21) Appl. No.: 17/713,185

(22) Filed: Apr. 4, 2022

(65) Prior Publication Data
US 2022/0303607 A1    Sep. 22, 2022

Related U.S. Application Data

(63) Continuation of application No. PCT/US2020/054164, filed on Oct. 3, 2020.

(60) Provisional application No. 62/910,854, filed on Oct. 4, 2019.

(51) Int. Cl.
*H04N 21/41* (2011.01)
*H04N 21/414* (2011.01)
*H04N 21/422* (2011.01)
*H04N 21/45* (2011.01)
*H04N 21/4788* (2011.01)

(52) U.S. Cl.
CPC .  *H04N 21/41422* (2013.01); *H04N 21/42202* (2013.01); *H04N 21/4532* (2013.01); *H04N 21/4788* (2013.01)

(58) Field of Classification Search
CPC ....... H04N 21/41422; H04N 21/42202; H04N 21/4532; H04N 21/4788; H04N 21/4302; H04N 21/4524; H04N 21/436; G06Q 30/0265; G06Q 50/01; G06Q 50/40
See application file for complete search history.

(56) References Cited

U.S. PATENT DOCUMENTS

| 5,717,392 | A  | * | 2/1998  | Eldridge ............ G01C 21/3652 340/988 |
| 8,954,252 | B1 |   | 2/2015  | Urmson et al. |
| 10,488,860 | B1 | * | 11/2019 | Koch .................. G06F 16/9537 |

(Continued)

FOREIGN PATENT DOCUMENTS

KR         20140103999 A      8/2014

*Primary Examiner* — Timothy R Newlin
(74) *Attorney, Agent, or Firm* — Bookoff McAndrews, PLLC

(57) ABSTRACT

Systems and computer-implemented methods are disclosed for providing social entertainment experiences in a moving vehicle via an apparatus that simulates human social behavior relevant to a journey undertaken by the vehicle, for displaying human-perceivable exterior communication on the moving vehicle to neighboring vehicles and/or pedestrians, and for providing a modular travel experience.

20 Claims, 18 Drawing Sheets

(56) References Cited

U.S. PATENT DOCUMENTS

| | | | |
|---|---|---|---|
| 2005/0137785 A1* | 6/2005 | Ruschkowski | G01C 21/3629 701/527 |
| 2007/0283838 A1* | 12/2007 | Hwang | A63G 7/00 104/47 |
| 2008/0051990 A1* | 2/2008 | Nomura | G01C 21/3697 701/533 |
| 2008/0201227 A1* | 8/2008 | Bakewell | G06Q 30/02 705/14.19 |
| 2009/0105933 A1* | 4/2009 | Wlotzka | H04N 21/4223 701/532 |
| 2010/0100907 A1* | 4/2010 | Chang | H04N 21/4753 715/706 |
| 2010/0110314 A1* | 5/2010 | Kusano | G08G 1/096872 340/988 |
| 2012/0068490 A1 | 3/2012 | Vance | |
| 2012/0218412 A1* | 8/2012 | Dellantoni | G01C 21/3602 348/148 |
| 2012/0232791 A1 | 9/2012 | Sterkel et al. | |
| 2013/0173358 A1* | 7/2013 | Pinkus | G06Q 30/0265 705/14.62 |
| 2014/0229287 A1* | 8/2014 | Ben-David | G06Q 50/01 705/14.66 |
| 2014/0236472 A1* | 8/2014 | Rosario | G08G 1/096741 701/400 |
| 2015/0077272 A1 | 3/2015 | Pisz et al. | |
| 2015/0124164 A1* | 5/2015 | Sin | G06F 3/1446 348/460 |
| 2016/0198288 A1* | 7/2016 | Burns | H04W 4/80 455/41.2 |
| 2016/0381412 A1* | 12/2016 | Couleaud | H04N 21/4223 725/46 |
| 2017/0132663 A1* | 5/2017 | High | H04W 4/023 |
| 2017/0142470 A1* | 5/2017 | Tsuchida | H04N 21/454 |
| 2017/0236415 A1* | 8/2017 | Okabe | G08G 1/127 701/117 |
| 2017/0308930 A1* | 10/2017 | Shore | G06Q 30/0265 |
| 2018/0025060 A1* | 1/2018 | Sasaki | G06F 16/9535 707/734 |
| 2018/0147728 A1* | 5/2018 | Vyas | G06F 3/014 |
| 2018/0216956 A1* | 8/2018 | Ritcherson | H04W 4/021 |
| 2018/0295406 A1* | 10/2018 | Hernandez | G01S 19/13 |
| 2018/0352282 A1* | 12/2018 | Lin | H04N 21/4781 |
| 2019/0050952 A1* | 2/2019 | Goldberg | G06Q 10/087 |
| 2019/0096297 A1* | 3/2019 | Cary | B60Q 1/545 |
| 2019/0156714 A1* | 5/2019 | Isgar | G08G 1/093 |
| 2019/0355254 A1* | 11/2019 | Seki | G06Q 10/04 |
| 2019/0385194 A1* | 12/2019 | Binkley | G06Q 30/0267 |
| 2020/0200556 A1* | 6/2020 | Boston | G01C 21/343 |
| 2020/0349666 A1* | 11/2020 | Hodge | G01C 21/3602 |
| 2021/0063182 A1* | 3/2021 | Williams | G01C 21/3679 |
| 2021/0067811 A1* | 3/2021 | Bates | H04N 21/41422 |
| 2021/0110315 A1* | 4/2021 | Fox | G06F 16/9536 |
| 2021/0370954 A1* | 12/2021 | Alvarez | G06V 20/59 |
| 2022/0101881 A1* | 3/2022 | Ito | G06Q 10/00 |
| 2023/0103180 A1* | 3/2023 | Alfred | G06Q 50/40 348/14.08 |
| 2023/0306467 A1* | 9/2023 | Andersen | G01C 21/3617 |
| 2024/0043042 A1* | 2/2024 | Kashiwakura | G01C 21/343 |

* cited by examiner

HARDWARE FOR ENTERTAINMENT CONTENT IN VEHICLES

CROSS-REFERENCE TO RELATED APPLICATION

The present disclosure is a continuation of International App. Serial No. PCT/US20/54164 filed Oct. 3, 2021, which claims priority to U.S. provisional application Ser. No. 62/910,854 filed Oct. 4, 2019, which application is incorporated herein in its entirety by reference.

FIELD

The present disclosure relates to apparatus, systems and methods for enhancing a vehicle with entertainment, social, and travel-related content.

BACKGROUND

While traveling in vehicles equipped with network access, passengers can access content and applications provided over the network, for example, social networking applications and media content. However, current applications and user devices are either focused solely on navigational or operational aspects of vehicle travel or are consumed on the same devices as used when not in a vehicle, for example, smart phones, tablets, or mixed reality gear. Passengers in vehicle lack dedicated hardware that can make vehicular travel more engaging and entertaining. Furthermore, the coming introduction of autonomous vehicles (AVs) should increase demand for entertainment and non-navigational social interaction in vehicles as a human driver is no longer needed and passengers need something other than navigation or driving to occupy their time.

In another aspect, vehicle customization as personal expression has been part of vehicle ownership since the bumper sticker. As fewer people own cars, the opportunities to customize a vehicle for personal tastes or expression diminish. Hardware for providing avenues for personal customization and expression are hardly more sophisticated than air fresheners and fuzzy dice, despite advances in robotic and electronic technologies.

Other vehicle equipment is used for signaling to people outside, such as pedestrians or other drivers. Signaling devices include brake lights, turn indicators, and the vehicles horn. Enterprising drivers can also use headlight to signal, gesture, or yell out an open window. All these devices and methods are almost as old as the automobile itself and have a limited expressive range.

It would be desirable, therefore, to provide new hardware, systems and methods for providing entertainment experiences in a moving vehicle and more effective technology for customization, personal expression, and signaling with those outside the vehicle in connection with vehicular travel that overcome these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, systems and computer-implemented methods are disclosed for providing entertainment experiences in a moving vehicle. As used in the present disclosure, vehicles are connected vehicles and may be referred to simply as vehicles and may include various suitable types of vehicles, whether driven autonomously or driven by a person. In an aspect, the vehicle may be coupled to a peer-to-peer network, a mobile mesh network, and to a wireless wide area network. As a vehicle travels, it connects to one or more other vehicles, either directly or via one or more servers, to provide entertainment experiences to the passengers. The entertainment experiences may include programs for social interaction, such as social networking applications (Facebook™, Twitter™, etc.), and multiplayer games.

In general, drivers are occupied with driving and therefore cannot safely participate in all types of entertainment experiences while driving apart from audio-only experiences. While the technologies described herein can be applied to customize audio entertainment for drivers, the focus of the application is on customizing general entertainment experiences for passengers in autonomous or human-driven vehicles who are able to focus their attention elsewhere than the road. Accordingly, as used herein "passenger" includes all vehicle occupants to the extent their attention will not be diverted by entertainment from safely driving the vehicle, including non-drivers for all forms of entertainment described herein and drivers only for non-distracting entertainment, including mainly hands-free audio, imagery, olfactory or tactile content presented at times and in modes that will not distract the driver from driving. Significant use cases for the present technology include autonomous vehicles in which all occupants are passengers and no danger of distracting the driver by entertainment content exists. Use cases may also include human-driven vehicles, in which the entertainment content should be presented in a mode that does not distract the driver, for example, on portable passenger devices (PPDs) such as smartphones, smartwatches, notepad computers, laptop computers, mixed reality headsets, toy figures, dolls, virtual reality/augmented reality headsets, and other special purpose media players.

In an aspect, the systems and methods may include an apparatus comprising a portable housing, at least one processor in an interior of the housing, at least one output device and a memory coupled to the at least one processor. The portable housing may have a form factor selected from one of the PPDs. The memory may hold program instructions executable by the at least one processor. In an aspect, the apparatus may sense that a journey from an origin to a destination has been initiated. In an aspect, the apparatus may initiate the journey. In another aspect, the vehicle or a controller may initiate the journey. The controller may be co-located in the vehicle, or may be located at a remote location, for example, at a server.

The apparatus may further access a program for non-navigational social interaction with one or more passengers during the journey, In an aspect, the apparatus may access the program for non-navigational social interaction based at least in part on the sensing of the initiation of the journey, and on one or more identifiers for the journey. The identifiers may include the origin, destination, and points of interest along the journey, trip purpose, vehicle physical location/city, and travel context such as weather, rain or snow.

In an aspect, the apparatus may access the program for non-navigational social interaction based at least in part on user intentional input, user profile data, involuntary biometric sensor data, or a combination thereof. User profile data may include for example: user past and present affinities (or past and present preference data), general social trends, social trends applying to user, demographic attributes of the user, membership status in a real or virtual group. User targeted affinities may further include one or more of shared interests in media content, similarity in demographic profile, a common destination, or prior social connections. When the program for non-navigational social interaction relates to group activities or multiplayers, the apparatus may also access the program for non-navigational social interaction based at least in part on user profiles of members of a group. In various aspects, various data in the profiles may be used in various combinations.

In an aspect, the apparatus may further execute the program for social non-navigational interaction in synchrony with progress of the journey, thereby causing the output device to output human-perceivable interactive social behavior relating to the journey.

In an aspect, the at least one output device of the apparatus may comprise at least one audio output transducer. In this aspect, the human-perceivable interactive social behavior outputted by the apparatus may comprise speech. One such speech may include commenting on the journey. Instructions, for example held in the memory of the apparatus, may generate the human-perceivable speech at least in part by sending an audio signal to the transducer.

In an aspect, the at least one output device of the apparatus may comprise at least one electronic display screen. In this aspect, the human-perceivable interactive social behavior outputted at the screen by the apparatus may comprise facial expression or body language. Instructions, for example held in the memory of the apparatus, may generate the human-perceivable facial expression or body language at least in part by sending a video signal to the electronic display screen.

In an aspect, the at least one output device of the apparatus may comprise a motorized armature for a toy figure. In this aspect, the human-perceivable interactive social behavior outputted by the apparatus may comprise speech, facial expression and/or body language. Instructions, for example held in the memory of the apparatus, may generate the human-perceivable speech at least in part by sending an audio signal to the transducer, and generate the human-perceivable facial expression and/or body language at least in part by sending motor control signals to the motorized armature.

In an aspect, the apparatus may further act as a guide to objects of interest along the route or the journey. In an aspect, the program for non-navigational social interaction may act as the guide. In this aspect, instructions, for example held in the memory of the apparatus, may generate the program for non-navigational social interaction during the journey at least in part by querying a database of geographic information based on information defining the journey. The geographic information may also include historical, cultural and entertainment information that may be useful for a guide.

In an aspect, where the apparatus is co-present with one or more media players in a vehicle traversing the journey, the apparatus may further provide access to media content via the media player. The apparatus is distinct from the one or more media players. Media content may include audio video works, for example a movie, a television show or series, an advertisement, a game, virtual reality or augmented reality content, and the like.

In an aspect, the instructions, for example held in the memory of the apparatus, may unlock one or more features of the apparatus based at least in part on presence of the apparatus in a vehicle traversing the journey. In an aspect, the instructions may unlock features of a video game related to a character represented by the apparatus.

In another aspect of the disclosure, systems and computer-implemented methods are disclosed for outputting human-perceivable exterior communication on a moving vehicle. The systems and methods may include an apparatus comprising at least one display positioned on an exterior of a vehicle, at least one processor and a memory coupled to the at least one processor. The memory may hold program instructions executable by the at least one processor. In an aspect, the apparatus may receive sensed information on at least one object external to the vehicle. In an aspect, the external object may be another vehicle, a pedestrian, or an object which is in proximity to the vehicle. In an aspect, the vehicle may be equipped with GPS sensor, and/or equipped on the exterior with one or more camera and/or motion sensors that detect the presence of the external object. A camera positioned on the exterior of the vehicle may capture an image of the external object.

In an aspect, the apparatus may display human-perceivable information on the external object on at least one output device which is positioned on the interior of the vehicle, for example, a display screen or audio transducer. If a camera captured an image of the object, the image may be displayed on the display screen. The display may be positioned so that the driver of the vehicle has an unobstructed view that does not present any safety issue, for example, the display may be on or near the dashboard.

In an aspect, the apparatus determines at least one exterior communication output based on the external object(s). In an aspect, the apparatus retrieves content for display from a database in a shared network that the vehicle shares with other vehicles. The apparatus may use a Venn Diagram based algorithm to determine the display content based on shared social interests among passengers in the vehicles in the shared network. In an aspect, the apparatus further determines the display content based on shared social interests at a specific location.

In an aspect, the apparatus determines at least one exterior communication output based on user preferences. The apparatus may retrieve content for display from a database of preset user preferred selections. The apparatus may calculate and display, for example on a touch screen on the dashboard of the vehicle, the content available to be displayed based on the user's preference.

In an aspect, the apparatus determines at least one exterior communication output based on brand offerings. The apparatus may retrieve content for display from a database of promotional branded offerings. Branded content displayed on the vehicle's exterior may be available for promotional use, for example, to incite excitement over an upcoming release and/or product. For example, if a new film from a movie label, e.g., DC Films, is about to be released, and two vehicles pass each other whose passengers both happen to be fans of DC Films which includes Batman, one vehicle may have the mood skin of Batman's face mask emitting light while the other vehicle may have dark light emitting resembling the Batmobile.

In an aspect, the apparatus may sense that the vehicle has become operational and starts progressing on a journey. The apparatus may determine at least one exterior communication output for the length of the journey.

In an aspect, the at least one exterior communication output may further include gesture, for example facial expression, and audio. The apparatus may interchange the exterior communication output based on activity, use and function. In sync with the communication visuals, the apparatus may emit audio in the form of isolated sounds, specialty effects, verbal sounds, or music. Isolated sounds may include a car horn or a whistle, while verbal sounds may include saying "Good Morning", "After you", or "Watch out!", etc.

In an aspect, the gestures and audio may include built in presets that are customized to the passenger's preferences. These presets may have already determined what the scope of the visuals include, and what the voice will sound like in addition to what the preset audio script will be emitting. In an aspect, the vehicle's function does not include carrying on a full conversation, but rather briefly interacting with passing motorists or pedestrians with critical or socially acceptable points of information during the vehicle's course of travel.

In an aspect, the apparatus may sense that the vehicle has become operational and starts progressing on a journey. The apparatus may determine at least one exterior communication output based on one of the methods above, e.g., user's preference or brand offerings. The content displayed may reflect, for example, a stationary Batman mask. When another vehicle comes too close to the vehicle, the apparatus may automatically decide to gesture a "Watch Out" visual in the Batman's facial expression to communicate to the other "at fault" vehicle. In an aspect, the apparatus may use an AI object detection machine-based learning algorithm to identify (e.g., recognize) the external object as a vehicle (or a pedestrian), and to decide the gesture. In another aspect, the apparatus may alert the passenger to the potential safety hazard on a display screen, and the passenger may select to deliver a visual warning to the other vehicle.

The apparatus, systems and methods described herein provide an automated process for providing entertainment experiences in a moving vehicle. Applications for the apparatus, systems and methods may include, for example, producing games for play, guide for a journey, and entertainment content in moving vehicles.

The foregoing methods may be implemented in any suitable programmable computing apparatus in conjunction with a vehicle or other conveyance, by provided program instructions in a non-transitory computer-readable medium that, when executed by a computer processor, cause the apparatus to perform the described operations. The processor may be local to the apparatus and user, located remotely, or may include a combination of local and remote processors. An apparatus may include a computer or set of connected computers that is used in audio video production or for output of audio video content to one or more users. An audio video output device may include, for example, a personal computer, mobile phone, notepad computer, mixed reality device, virtual reality device, augmented reality device, toy figures, or special-purpose hardware for vehicles. Special-purpose hardware for vehicles may include, for example, window glass equipped with one or more LCD layers for augmented reality or conventional display, projectors with projection screens incorporated into the vehicle interior; seats equipped with motion-simulating and/or motion-damping systems; vehicle audio systems; and active vehicle suspensions. Other elements of the apparatus may include, for example, an audio output device and a user input device, which participate in the execution of the method. An apparatus may include a virtual, augmented, or mixed reality device, such as a headset or other display that reacts to movements of a user's head and other body parts. The apparatus may include biometric sensors that provide data used by the method.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects.

Figure 1:
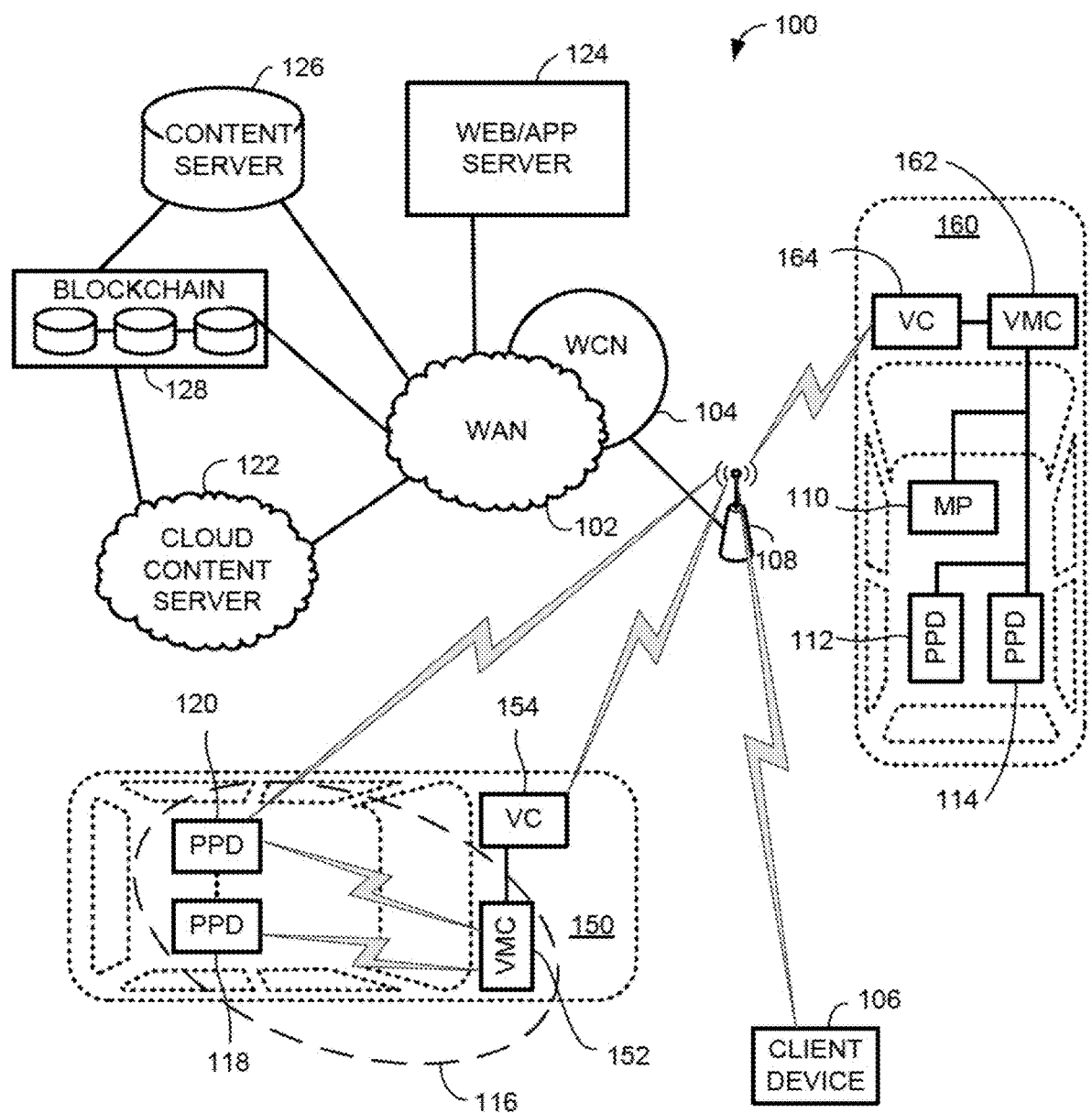
FIG. 1 is a schematic block diagram illustrating aspects of a system and apparatus for providing entertainment experiences in a moving vehicle.

Referring to FIG. 1, methods for providing entertainment experiences in a moving vehicle 150, 160 may be implemented in a network 100. Other architectures may also be suitable. In a network architecture, user input and sensor data can be collected and processed locally and used to control streaming data from a network source. In alternative aspects, audio-video content may be controlled locally, and log data provided to a remote server. The audio-video content, also referred to as digital content, media content or entertainment content, includes digital audio, video, audio-video and mixed reality content, and includes interactive and non-interactive media programs or games. The media content may also be configured to support interactive features resembling video game features and/or conversation features. In an alternative, or in addition, the media content may be devoid of interactive features except for responding to data indicative of user's location, preferences, biometric states or affinities.

A suitable network environment 100 for practice of the systems and methods summarized herein may include various computer servers and other network entities in communication with one another and with one or more networks, for example a Wide Area Network (WAN) 102 (e.g., the Internet) and/or a wireless communication network (WCN) 104, for example a cellular telephone network using any suitable high-bandwidth wireless technology or protocol, including, for example, cellular telephone technologies such as 3rd Generation Partnership Project (3GPP), Long Term Evolution (LTE), 5G fifth-generation cellular wireless, Global System for Mobile communications (GSM) or Universal Mobile Telecommunications System (UMTS), and/or a wireless local area network (WLAN) technology using a protocol such as Institute of Electrical and Electronics Engineers (IEEE) 802.11, and equivalents thereof. In an aspect, for example as in a mesh network, the servers and other network entities (collectively referred to as "nodes") connect directly, dynamically and non-hierarchically to as many other nodes as possible and cooperate with one another to efficiently route data from/to client devices. This lack of dependency on one node allows for every node to participate in the relay of information. Mesh networks can dynamically self-organize and self-configure. In another aspect, the servers can connect to client devices in a server-client structure. In an aspect, some client devices can also act as servers.

Client devices may include, for example, portable passenger devices (PPDs) such as smartphones, smartwatches, notepad computers, laptop computers, mixed reality headsets, toy figures, OLED, QLED or other display controllers, and special purpose media players and servers, herein called vehicle media controllers (VMCs) installed as part of vehicular electronic systems. VMCs 152, 162 may be coupled to vehicle controllers (VCs) 154, 164 as a component of a vehicular control system. The VC may control other functions with various components, for example, engine control, interior climate control, anti-lock braking, navigation, or other functions, and may help coordinate media output of the VMC to other vehicular functions, especially navigation.

Computer servers may be implemented in various architectures. For example, the environment 100 may include one or more Web/application servers 124 containing documents and application code compatible with World Wide Web protocols, including but not limited to HTML, XML, PHP and Javascript documents or executable scripts, for example. The environment 100 may include one or more content servers 126 for holding data, for example video, audio-video, audio, and graphical content components of media content, e.g., media programs or games, for consumption using a client device, software for execution on or in conjunction with client devices, and data collected from users or client devices. Data collected from client devices or users may include, for example, sensor data and application data. Sensor data may be collected by a background (not user-facing) application operating on the client device, and transmitted to a data sink, for example, a cloud-based content server 122 or discrete content server 126. Application data means application state data, including but not limited to records of user interactions with an application or other application inputs, outputs or internal states. Applications may include software for selection, delivery or control of media content and supporting functions. Applications and data may be served from other types of servers, for example, any server accessing a distributed blockchain data structure 128, or a peer-to-peer (P2P) server 116 such as may be provided by a set of client devices 118, 120, 152 operating contemporaneously as micro-servers or clients.

In an aspect, information held by one or more of the content server 126, cloud-based content server 122, distributed blockchain data structure 128, or a peer-to-peer (P2P) server 116 may include a data structure of media content production data in an ordered arrangement of media content components.

As used herein, users (who can also be passengers) are consumers of media content. When actively participating in content via an avatar or other agency, users may also be referred to herein as player actors. Consumers are not always users. For example, a bystander may be a passive viewer who does not interact with the content or influence selection of content by a client device or server.

The network environment 100 may include various passenger portable devices, for example a mobile smartphone client 106 of a user who has not yet entered either of the vehicles 150, 160. Other client devices may include, for example, a notepad client, or a portable computer client device, a mixed reality (e.g., virtual reality or augmented reality) client device, or the VMCs 152, 162. PPDs may connect to one or more networks. For example, the PPDs 112, 114, in the vehicle 160 may connect to servers via a vehicle controller 164. In some implementations the PPDs 112, 114, in the vehicle 160 may connect to servers via a wireless access point 108, the wireless communications network 104 and the WAN 102. In some such implementations, the VC 164 acts as a router/modem combination or a mobile wireless access point (WAP). For further example, in a mobile mesh network 116, various client devices (e.g., PPD nodes 118, 120, or VMC 152) may include small radio transmitters that function as a wireless router. The nodes 118, 120, 152 may use the common WiFi standards to communicate wirelessly with client devices, and with each other.

Figure 2:
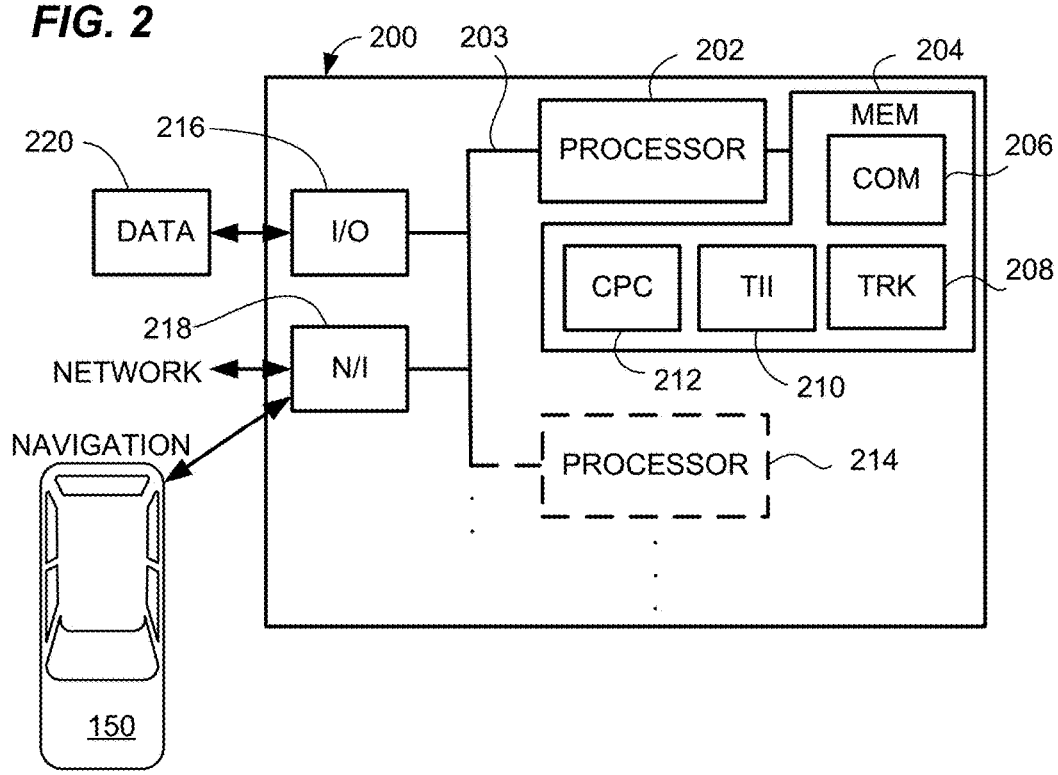
FIG. 2 is a schematic block diagram illustrating aspects of a server for providing entertainment experiences in a moving vehicle.

FIG. 2 shows a content server 200 for controlling output of media content, which may operate in the environment 100, for example as a VMC 152, 162 or content server 122, 126, 128. The server 200 may include one or more hardware processors 202, 214 (two of one or more shown). Hardware may include firmware. Each of the one or more processors 202, 214 may be coupled to an input/output port 216 (for example, a Universal Serial Bus port or other serial or parallel port) to a source 220 for sensor data indicative of vehicle or travel conditions. Suitable sources may include, for example, Global Positioning System (GPS) or other geolocation sensors, one or more cameras configuring for capturing road conditions and/or passenger configurations in the interior of the vehicle 150, one or more microphones for detecting exterior sound and interior sound, one or more temperature sensors for detecting interior and exterior temperatures, door sensors for detecting when doors are open or closed, and any other sensor useful for detecting a travel event or state of a passenger. Some types of servers, e.g., cloud servers, server farms, or P2P servers, may include multiple instances of discrete servers 200 that cooperate to perform functions of a single server.

The server 200 may include a network interface 218 for sending and receiving applications and data, including but not limited to sensor and application data used for controlling media content as described herein. The content may be served from the server 200 to a client device or stored locally by the client device. If stored local to the client device, the client and server 200 may cooperate to handle sensor data and other player actor functions. In some embodiments, the client device may handle all content control functions and the server 200 may be used for tracking only or may not perform any critical function of the methods herein. In other aspects, the server 200 performs content control functions.

Each processor 202, 214 of the server 200 may be operatively coupled to at least one memory 204 holding functional modules 206, 208, 210, 212 of an application or applications for performing a method as described herein. The modules may include, for example, a communication module 206 for communicating with client devices and servers. The communication module 206 may include instructions that when executed by the processor 202 and/or 214 cause the server to communicate control data, content data, and sensor data with a client device via a network or other connection. A tracking module 208 may include functions for tracking travel events using sensor data from the source(s) 220 and/or navigation and vehicle data received through the network interface 218 or other coupling to a vehicle controller. In some embodiments, the tracking module 208 or another module not shown may track emotional responses and other interactive data for one or more passengers, subject to user permissions and privacy settings.

The modules may further include a journey or trip information integration (TII) module 210 that when executed by the processor causes the server to perform any one or more of determining associations of media content with one or more parameters indicating user-perceivable characteristics of the media content, including at least an indicator of semantic meaning relevant to one or more travel events. For example, the TII module 210 may determine input parameters including a trip destination for one or more passengers, current road conditions, and estimated remaining travel duration based on data from the tracking module 208, and apply a rules-based algorithm, a heuristic machine learning algorithm (e.g., a deep neural network) or both, to create one or more media content identifiers consistent with the input parameters. The TII module 210 may perform other or more detailed operations for integrating trip information in media content selection as described in more detail herein below.

The modules may include, for example, a media production or configuration process (CPC) module 212. The CPC module 212 may include instructions that when executed by the processor 202 and/or 214 cause the server 200 to perform one or more of producing or configuring media content for output by a player device during the trip at least in part by at least one of selecting or configuring ones of the media components based at least in part on one or more of the trip destination and the estimated duration, and further operations as described in more detail herein below. The memory 204 may contain additional instructions, for example an operating system, and supporting modules.

Figure 3:
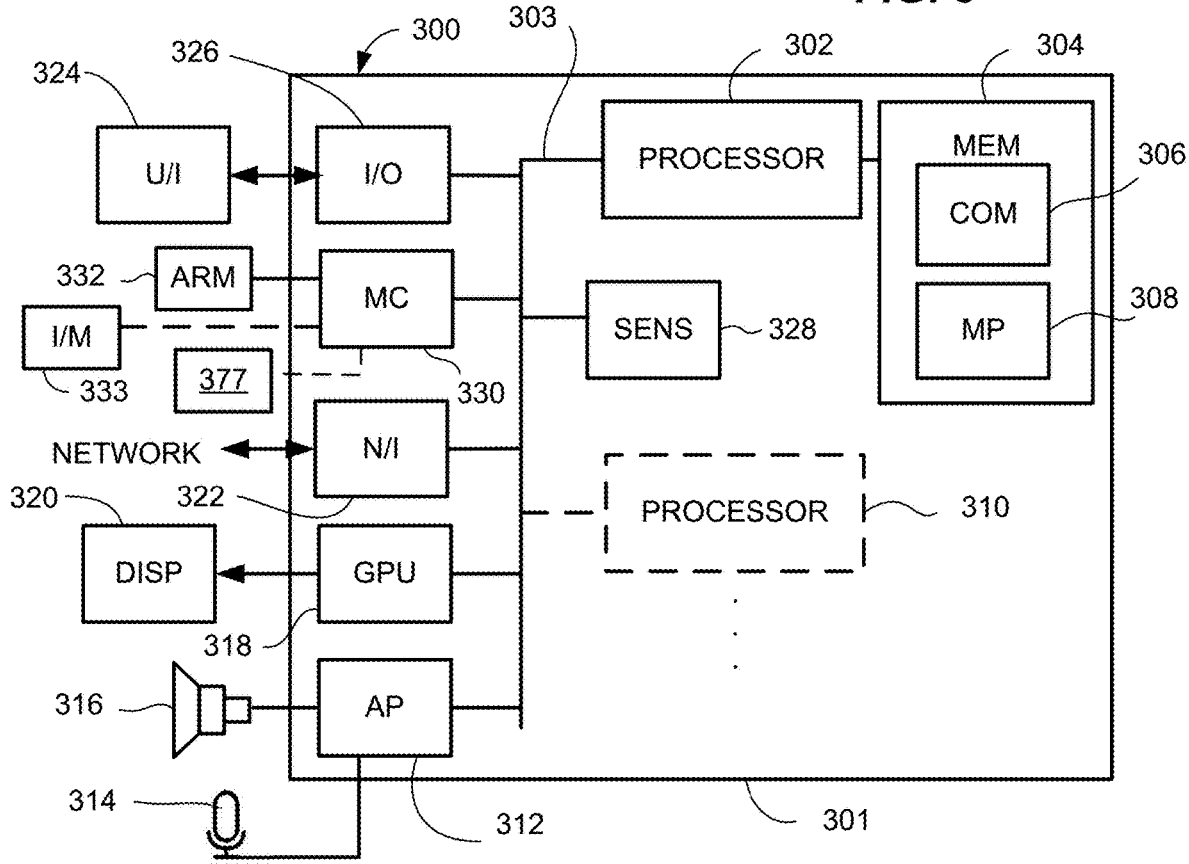
FIG. 3 is a schematic block diagram illustrating aspects of a client device for providing entertainment experiences in a moving vehicle.

FIG. 3 shows aspects of a content player device 300 for operating on and controlling output of digital media content. In some embodiments, the same computing device (e.g., device 300) may operate both as a content player device and as a content configuration server, for example, as a node of a mesh network. In such embodiments, the computing device may also include functional modules and interface devices as described above for the server 200.

For content playing, the apparatus 300 may include a processor 302, for example a central processing unit, a system-on-a-chip, or any other suitable microprocessor. The processor 302 may be communicatively coupled to auxiliary devices or modules of the apparatus 300, using a bus or other coupling. Optionally, the processor 302 and its coupled auxiliary devices or modules may be housed within or coupled to a housing 301, for example, a housing having a form factor of a television, active window screen, projector, smartphone, portable computing device, wearable goggles, glasses, visor, or other form factor.

A user interface device 324 may be coupled to the processor 302 for providing user control input to a media control process. In some implementations, the process can be configured to convert user control input to game commands. In some implementations, the process can be configured to control output of digital media content. In some aspects, the process may include outputting video and audio for a conventional flat screen or projection display device. In some aspects, the media control process may include outputting audio-video data for an immersive mixed reality content display process operated by a mixed reality immersive display engine executing on the processor 302. In some aspects, the process may include outputting haptic control data for a haptic glove, vest, or other wearable; motion simulation control data, or control data for an olfactory output device 377 such as an Olorama™ or Sensoryco™ scent generator or equivalent device. In some aspects, the media control process may include outputting audio-video data for a motorized armature for a toy figure.

The motorized armature 332 may be coupled to the processor 302 via motor control 330, for example, for controlling movements of a toy figure's facial expressions, including mouth movement, or body language. In alternative aspects, the armature 332 may be replaced by an isolator/motion controller 333 as described in connection with FIG. 17 for a modular isolation pod, for motion control as described in connection with FIG. 18.

User control input may include, for example, selections from a graphical user interface or other input (e.g., textual or directional commands) generated via a touch screen, keyboard, pointing device (e.g., game controller), microphone, motion sensor, camera, or some combination of these or other input devices represented by block 324. Such user interface device 324 may be coupled to the processor 302 via an input/output port 326, for example, a Universal Serial Bus (USB) or equivalent port. Control input may also be provided via a sensor 328 coupled to the processor 302. A sensor may comprise, for example, a motion sensor (e.g., an accelerometer), a position sensor, a camera or camera array (e.g., stereoscopic array), a biometric temperature or pulse sensor, a touch (pressure) sensor, an altimeter, a location sensor (for example, a Global Positioning System (GPS) receiver and controller), a proximity sensor, a motion sensor, a smoke or vapor detector, a gyroscopic position sensor, a radio receiver, a multi-camera tracking sensor/controller, an eye-tracking sensor, a microphone or a microphone array. The sensor or sensors 328 may detect biometric data used as an indicator of the user's emotional state, for example, facial expression, skin temperature, pupil dilation, respiration rate, muscle tension, nervous system activity, or pulse. In addition, the sensor(s) 328 may detect a user's context, for example an identity position, size, orientation and movement of the user's physical environment and of objects in the environment, motion or other state of a user interface display, for example, motion of a virtual-reality headset. The sensor or sensors 328 may generate orientation data for indicating an orientation of the apparatus 300 or a passenger using the apparatus. For example, the sensors 328 may include a camera or image sensor positioned to detect an orientation of one or more of the user's eyes, or to capture video images of the user's physical environment or both. In some aspects, a camera, image sensor, or other sensor configured to detect a user's eyes or eye movements may be integrated into the apparatus 300 or into ancillary equipment coupled to the apparatus 300. The one or more sensors 328 may further include, for example, an interferometer positioned in the support structure 301 or coupled ancillary equipment and configured to indicate a surface contour to the user's eyes. The one or more sensors 328 may further include, for example, a microphone, array or microphones, or other audio input transducer for detecting spoken user commands or verbal and non-verbal audible reactions to output of the media content.

The apparatus 300 or a connected server (e.g., server 200) may track users' biometric states and media content play history. Play history may include a log-level record of control decisions made in response to player actor biometric states and other input. The apparatus 300 or a connected server (e.g., server 200) may track user actions and biometric responses across multiple game titles for individuals or cohorts.

Sensor data from the one or more sensors may be processed locally by the processor 302 to control display output, and/or transmitted to a server 200 for processing by the server in real time, or for non-real-time processing. As used herein, "real time" refers to processing responsive to user input without any arbitrary delay between inputs and outputs; that is, that reacts as soon as technically feasible. "Non-real time" refers to batch processing or other use of sensor data that is not used to provide immediate control input for controlling the display, but that may control the display after some arbitrary amount of delay.

To facilitate communication with another node of a computer network, for example the media content server 200, the client 300 may include a network interface 322, wired or wireless. Network communication may be used, for example, to enable multiplayer experiences, including immersive or non-immersive experiences of media content. The system may also be used for other multi-user applications, for example social networking, group entertainment experiences, instructional environments, and so forth. Network communication can also be used for data transfer between the client and other nodes of the network, for purposes including data processing, content delivery, content control, and tracking. The client may manage communications with other network nodes using a communications module 306 that handles application-level communication needs and lower-level communications protocols, preferably without requiring user management.

A display 320 may be coupled to the processor 302, for example via a graphics processing unit (GPU) 318 integrated in the processor 302 or in a separate chip. The display 320 may include, for example, a flat screen color liquid crystal (LCD) display illuminated by light-emitting diodes (LEDs) or other lamps, a projector driven by an LCD display or by a digital light processing (DLP) unit, a laser projector, or other digital display device. The display device 320 may be incorporated into a virtual reality headset or other immersive display system. Video output driven by a mixed reality display engine operating on the processor 302, or other application for coordinating user inputs with an immersive content display and/or generating the display, may be provided to the display device 320 and output as a video display to the user. Similarly, an amplifier/speaker or other audio output transducer 316 may be coupled to the processor 302 via an audio processor 312. Audio output correlated to the video output and generated by the media player module 308, media content control engine or other application may be provided to the audio transducer 316 and output as audible sound to the user. The audio processor 312 may receive an analog audio signal from a microphone 314 and convert it to a digital signal for processing by the processor 302. The microphone can be used as a sensor for detection of biometric state and as a device for user input of sound commands, verbal commands, or for social verbal responses to passengers. The audio transducer 316 may be, or may include, a speaker or piezoelectric transducer integrated to the apparatus 300. In an alternative or in addition, the apparatus 300 may include an audio output port for headphones or other audio output transducer mounted ancillary equipment such as a smartphone, VMC, xR headgear, or equivalent equipment. The audio output device may provide surround sound, multichannel audio, so-called 'object-oriented audio', or other audio track output from the media content.

The apparatus 300 may further include a random-access memory (RAM) 304 holding program instructions and data for rapid execution or processing by the processor, coupled to the processor 302. When the device 300 is powered off or in an inactive state, program instructions and data may be stored in a long-term memory, for example, a non-volatile magnetic, optical, or electronic memory storage device (not shown). Either or both RAM 304 or the storage device may comprise a non-transitory computer-readable medium holding program instructions, that when executed by the processor 302, cause the device 300 to perform a method or operations as described herein. Program instructions may be written in any suitable high-level language, for example, C, C++, C#, JavaScript, PHP, or Java™, and compiled to produce machine-language code for execution by the processor. The memory 304 may also store data, for example, audio-video data or games data in a library or buffered during streaming from a network node.

Program instructions may be grouped into functional modules 306, 308, to facilitate coding efficiency and comprehensibility, for example, a communications module 306 and a media player module 308. The modules, even if discernable as divisions or grouping in source code, are not necessarily distinguishable as separate code blocks in machine-level coding. Code bundles directed toward a specific type of function may be considered to comprise a module, regardless of whether or not machine code on the bundle can be executed independently of other machine code. The modules may be high-level modules only. The media player module 308 may perform operations of any method described herein, and equivalent methods, in whole or in part. Operations may be performed independently or in cooperation with another network node or nodes, for example, the server 200.

Figure 4A:
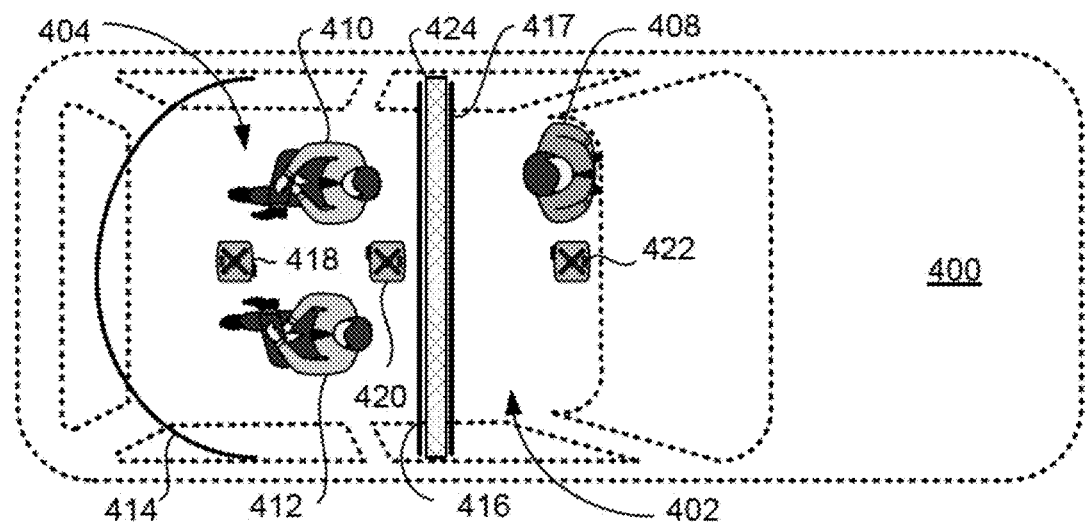
FIG. 4A is a schematic diagram showing features of a human-piloted vehicle equipped for passenger entertainment.

In a motor vehicle, the apparatus 300 may provide video content for projection onto an interior surface of the vehicle as the display 320. For example, in a vehicle 400 shown in FIG. 4A, one or more ceiling-mounted projectors 418, 420, 422 may project media content from the apparatus 300 onto corresponding screens 416, 414, 417. In the illustrated configuration, two passengers 410, 412 sitting in a passenger space 404 while a driver 408 occupies a cockpit 402. The cockpit 402 may be isolated from the passenger space 404 by a sound wall 424, which may be a wall of a pod as described in connection with FIGS. 16-17 below. The projector 422 may project video from rear-facing cameras of the vehicle 400, showing the rear view for the driver on a screen facing the driver. A screen for the driver may be placed in front of the driver or behind the driver (e.g., in lieu of or overlying the rear-view window). The projector 420 may project forward media content from the apparatus 300 onto a forward surround screen 414. The projector 418 may project rear media content coordinated in time to the forward media content onto the rear screen 416. "Forward" and "rear" are relative to the passengers' 410, 412 orientations, not the vehicle 400 orientation. Passenger and vehicle orientations may be aligned or non-aligned as shown in FIG. 4A. The rear screen 416 and forward screen 414 may be mounted on tracks enabling separation of the screens 414, 416 to admit or release passengers, and closure to enable a fuller surround view, up to and including a full 360° surround view.

In some driverless (e.g., autonomous vehicle) configurations, the sound wall 424, rear view screen 417, projector 422, driver 408 and cockpit 402 are omitted, and the entire cabin of the vehicle 400 may function as a passenger entertainment space 404. In some driverless embodiments, the rear projection screen 416 may be a surround screen like the forward screen 414. In an alternative, each of the walled portions may provided may modular sound-isolating pods that can be placed in and removed from vehicles using a mechanical robot, for example at a transfer station.

Figure 4B:
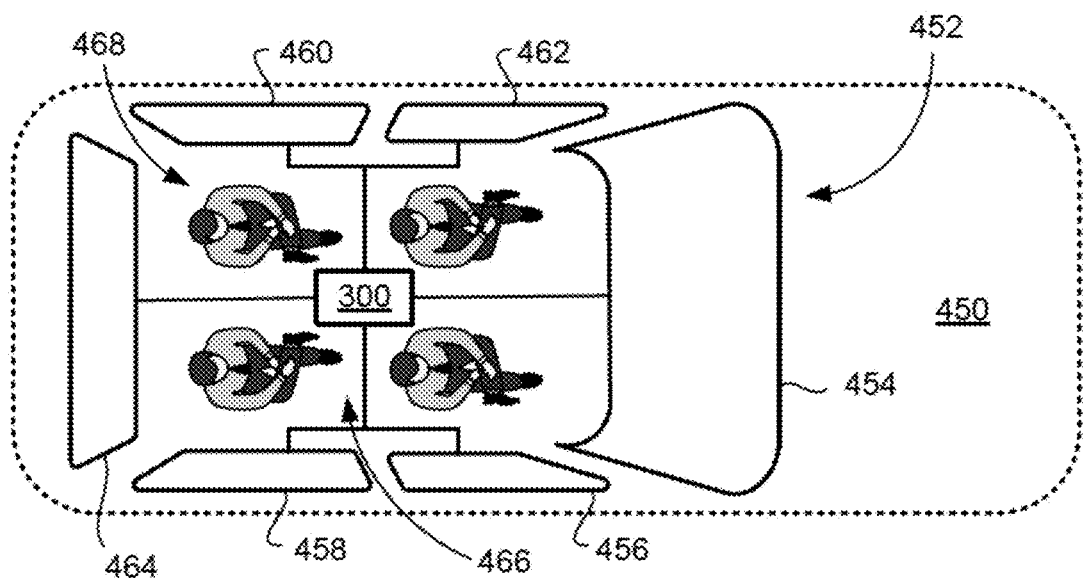
FIG. 4B is a schematic diagram showing features of an autonomous vehicle equipped to passenger entertainment.

Instead of or in addition to projection screens, electronic display screens may be used for display 320, for example, LCD or OLED screens in various resolutions, color spaces and dynamic ranges. In some driverless vehicles, the cabin can be darkened so either projectors or electronic screens can be easily visible. FIG. 4B shows a configuration of an autonomous vehicle 450 in which the window screens are replaced by electronic (e.g., LCD/LED/OLED/MEMS) screens 452, including a front screen 454, right side screens 456, 458 (one on each door) left side screens 460, 462 (one on each door) and a rear screen 464. One or more of the electronic screens 452 may be transparent or partially transparent LCD or OLED panels (also called see-through displays) for augmenting the natural view of the vehicle exterior, may have an opaque backing for virtual reality, or may include an electronic or mechanical shutter to transition between opaque and transparent or partially transparent states. In some implementations, one or multiple LCD layers may be used as an electronic shutter to transition between opaque and transparent states. The apparatus 300 or a VMC 152) may be coupled to the electronic screens 452 for controlling video output. One or more passengers 468 in the cabin 466 may view video content as if looking through the window, in see-through or opaque modes. In alternative embodiments, the vehicle windows are equipped with mechanical or electronic shutters to darken the cabin, and the apparatus 300 outputs the video content to the electronic screens in an interior to the vehicle, or to projectors as shown in FIG. 4A. The foregoing aspects may in some embodiments be provided in the walls of isolation pods as described further in connection with FIGS. 16-17. In an alternative or in addition, each of the passengers 468 may play the media content on a personal computing device, for example a smartphone, notepad computer or mixed reality headset.

In addition to conventional 2D output or 3D output for display on two-dimensional (flat or curved) screens (e.g., by televisions, mobile screens, or projectors), the media content output and control methods disclosed herein may be used with virtual reality (VR), augmented reality (AR) or mixed reality output devices (collectively referred to herein as xR). Some immersive xR stereoscopic display devices include a tablet support structure made of an opaque lightweight structural material (e.g., a rigid polymer, aluminum or cardboard) configured for supporting and allowing for removable placement of a portable tablet computing or smartphone device including a high-resolution display screen, for example, an LCD or OLED display. Other immersive xR stereoscopic display devices use a built-in display screen in a similar frame. Either type may be designed to be worn close to the user's face, enabling a wide field of view using a small screen size such as in smartphone. The support structure may hold a pair of lenses in relation to the display screen. The lenses may be configured to enable the user to comfortably focus on the display screen which may be held approximately one to three inches from the user's eyes. The device may further include a viewing shroud (not shown) coupled to the support structure and made of a soft, flexible or other suitable opaque material for form fitting to the user's face and blocking outside light. The immersive VR stereoscopic display device may be used to provide stereoscopic display output, providing a more immersive perception of 3D space for the user.

Figure 5:
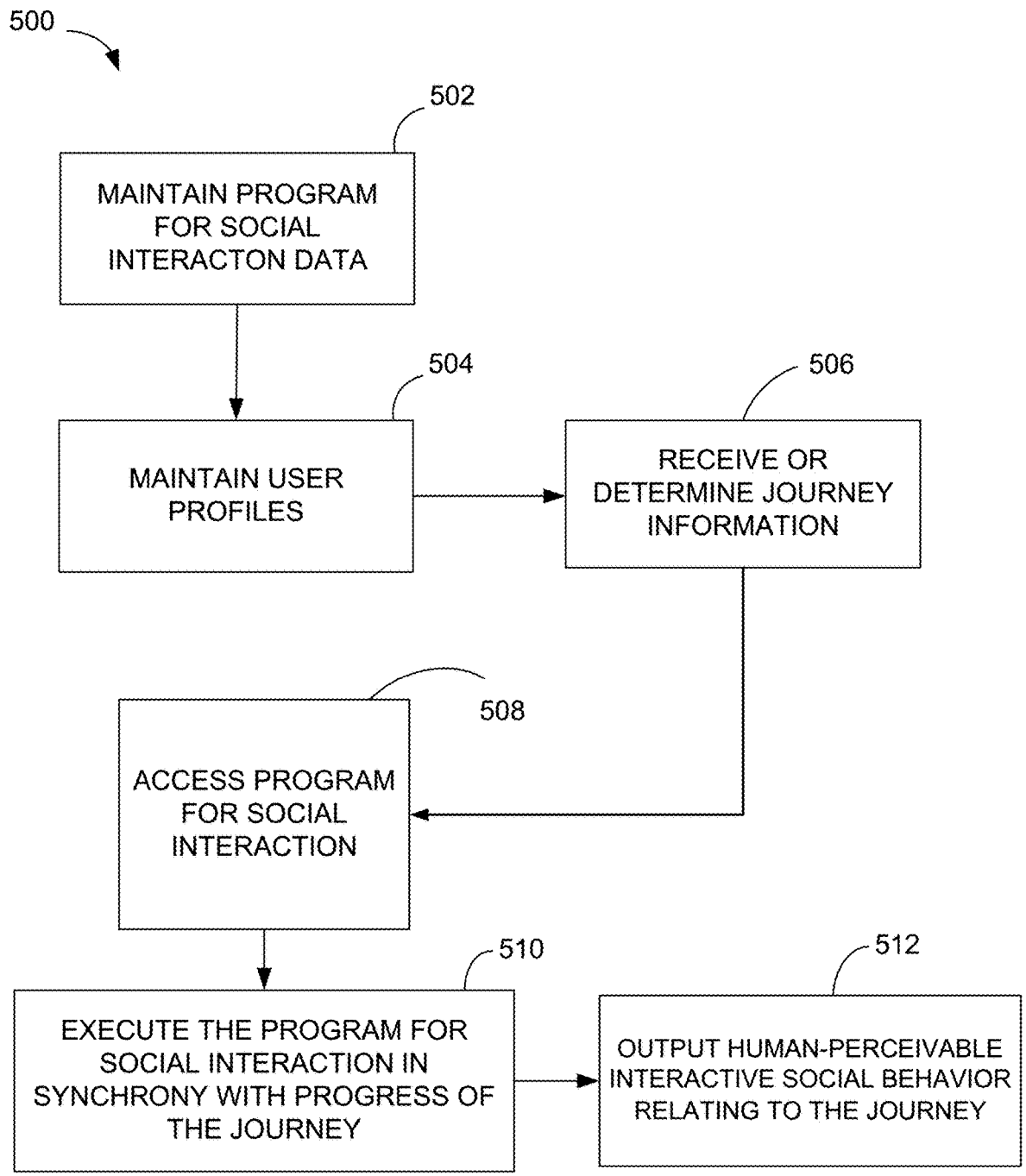
FIG. 5 is a schematic diagram illustrating an overview of providing entertainment experiences in a moving vehicle.

FIG. 5 shows an overview 500 of providing entertainment experiences in a moving vehicle. The method 500 may be performed by one or more computer processors of a server (e.g., the apparatus 300) in electronic communication with devices at the connected vehicles and servers at points of interests along travel routes, and/or an independent server not in electronic communication with the connected vehicles and servers at points of interests. At block 502, the one or more processors, at a content server (e.g., apparatus 200), maintain data structure of program for non-navigational social interaction in a program database. In an aspect, programs for non-navigational social interaction may include, for example, social networking applications (Facebook™, Twitter™, etc.), and multiplayer audio and video games, in each case adapted to be responsive to the current trip, vehicle progress along the trip, expected arrival time, or other data calculated from the vehicle's state in relation to a defined trip. At block 504, the one or more processors maintain a data structure of user profile data as described above in a user profile database.

At block 506, the one or more processors, may receive or determine information about a journey when a journey is initiated. In an aspect, a device or apparatus in the vehicle may initiate the journey. In another aspect, the device or apparatus in the vehicle may sense that a journey is initiated. Information about the journey may include at least an origin, a destination, and points of interest on the route. Other information may include journey or trip purpose, vehicle physical location/city, and travel context such as weather, rain or snow.

At block 508, the one or more processors may access a program for non-navigational social interaction with one or more passengers during the journey, based at least in part on sensing or receiving information that the journey has been initiated, and on one or more identifiers for the journey. In an aspect, the sensing may include receiving information, for example, indicating the starting of the engine of the vehicle, the movement of the vehicle along a route, or from user input.

At block 510, one or more processors at the device or apparatus in the vehicle may execute the program for non-navigational social interaction in synchrony with progress of the journey.

At block 512, the one or more processors at the device or apparatus in the vehicle, based on the execution of the program for social interaction, may cause one or more output device to output human-perceivable interactive social behavior relating to the journey. In various aspects, the human-perceivable interactive social behavior may include speech and outputted via audio signal sent to an audio transducer (e.g., transducer 316 in FIG. 3). The human-perceivable interactive social behavior may include facial expression or body language and outputted via video signal sent to an electronic display screen (e.g., display 320 in FIG. 3). In an aspect, the facial expression or body language may be outputted via motor control signals sent to a motorized armature (e.g., armature 332 in FIG. 3).

Figure 6:
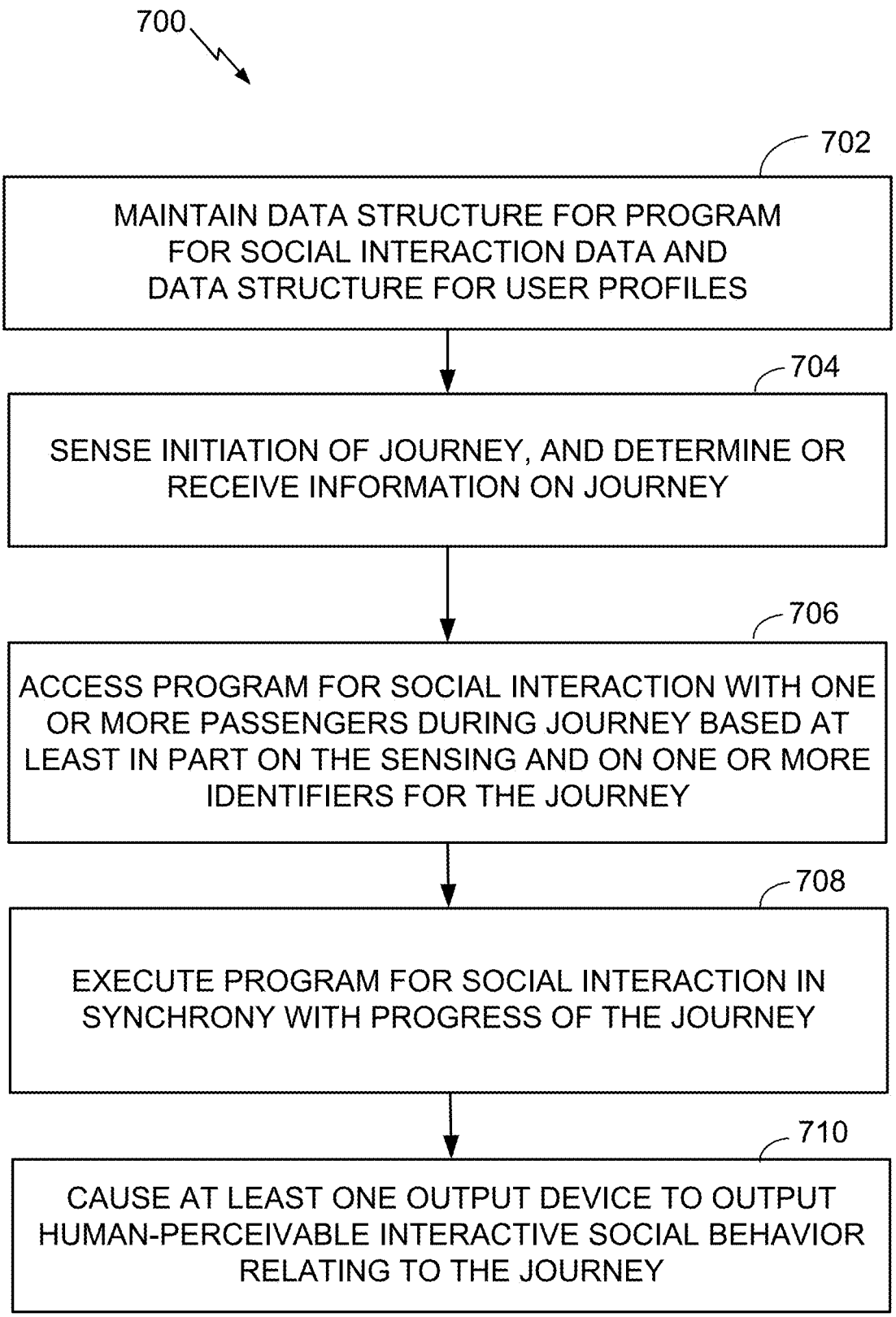
FIGS. 6 and 7 are flow diagrams illustrating a process for providing entertainment experiences in a moving vehicle.

FIG. 6 illustrates a useful automatic process 700 for providing entertainment experiences in a moving vehicle. In an aspect of the present disclosure, the process 700 may be performed by one or more processors at a server (e.g., the apparatus 200) and/or at a portable device (e.g., the apparatus 300). At 702, a processor maintains a data structure of programs for social interaction data in a first database, a data structure of user profile data in a second database. In some aspects, the processor may also maintain a data structure of vehicle profile data in a third database. The data for programs for social interaction may include analog or digital audio-video work, for example entertainment work, instructional, advertisement, gaming, social networking, and so on, of a non-navigational nature. In an aspect, the processor may maintain the first, second and third database as separate databases, or in any combination. In an aspect, computer process 702 may be performed at a server, and subsequent processes may be performed at a portable device.

At 704, the processor senses that a journey has been initiated at and/or for the vehicle. In an aspect, the processor may receive sensor signal via one or more sensors 328 (FIG. 3), for example, indicating the vehicle's engine started, or the vehicle started to move. In an aspect, the processor may receive signal from an application or from another in-vehicle device. In an aspect, the sensing or receiving of signal may include information of the journey. In an aspect, the sensing or receiving of signal may include identification of the journey, from which the processor can determine or retrieve information of the journey. The information may include at least an origin and destination of the journey. Other information may include points of interest along the journey, trip purpose, vehicle physical location/city, and travel context such as weather conditions.

At 706, the processor accesses or retrieves a program for social interaction. The program for non-navigational social interaction may be determined or selected based at least in part on the sensing, for example, based on the sensor information (e.g., vehicle status, vehicle location, passenger condition, passenger location, etc.), and in part on one or more identifiers for the journey, for example, origin, destination, and so on. In an aspect, the program for non-navigational social interaction may also be determined or selected based at least in part on profile(s) of the passenger(s).

In an aspect, if the program for non-navigational social interaction is a multiplayer game, the processor may determine or select the program for social interaction based in part on multiple user profiles of multiple passengers.

At 708, the processor executes the program for social interaction in synchrony with the progress of the journey. In an aspect, the processor may receive inputs from one or more sensors and other applications to monitor the progress of the journey. In an aspect, the processor may temporarily pause the execution of the program at geographical points on the route, or when the vehicle is in stationary position.

At 710, the processor, as it executes the program for social interaction, causes at least one output device to output human-perceivable interactive social behavior relating to the journey. The types of human-perceivable interactive social behavior may be unlimited. For the sake of examples, the behavior may include emotional reactions to events or geographical points on the route, to discussions or social interaction.

Figure 7:
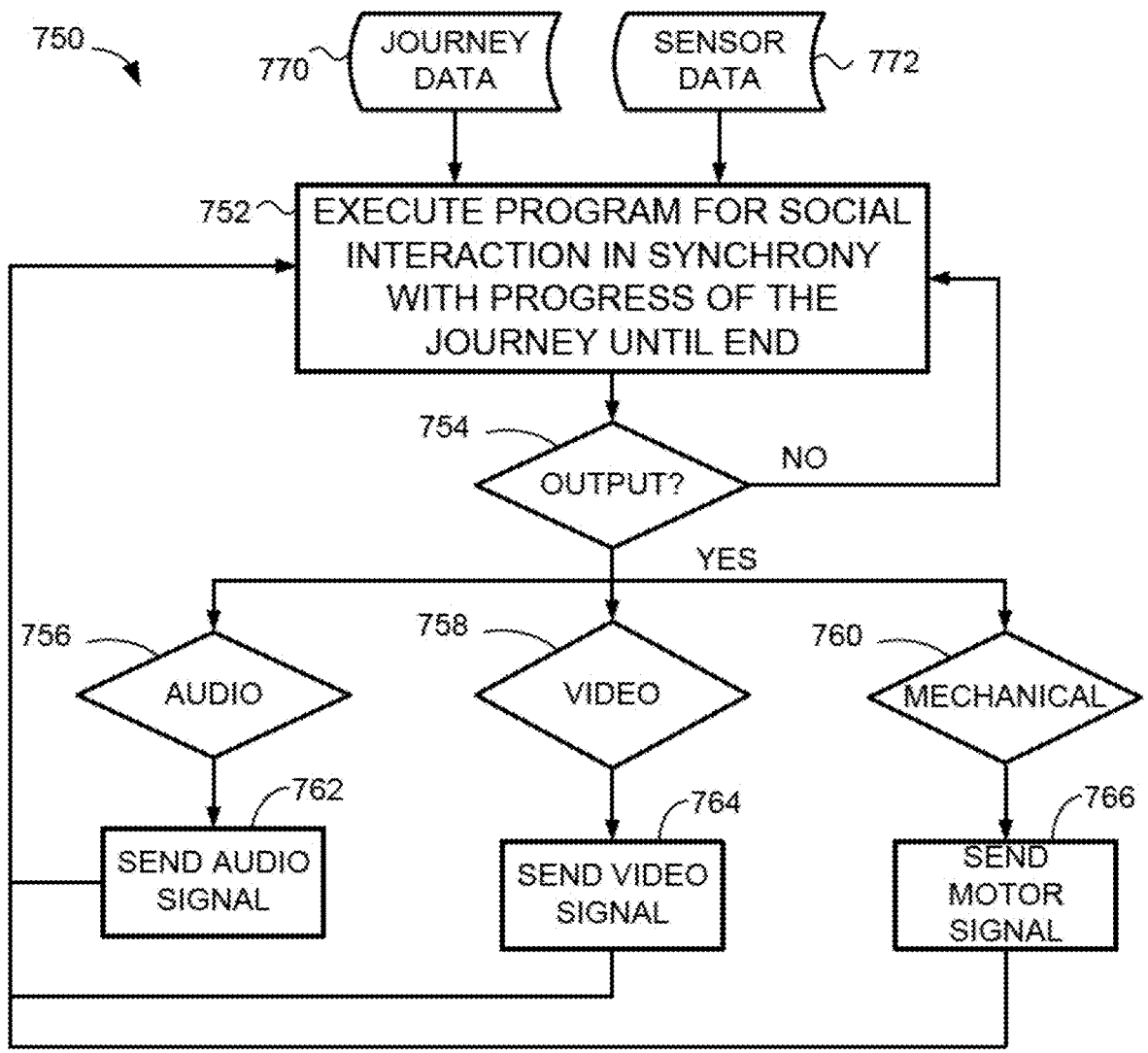

FIG. 7 shows additional operation 750 that may be included in the method 700 and performed by one or more processors performing the processes 756-766, in any operative order, or substantially simultaneously. At 752, the one or more processors execute the program for non-navigational social interaction until it ends (see also process 708 in FIG. 6). As the one or more processors execute the program, they may continuously receive data on the progress of the journey 750, including sensor data 772, such as current locations and events. at 754. In an aspect, the program may execute as an instructional guide or a tour guide. In this aspect, the one or more processors may coordinate the progress of the journey, the location of the vehicle to cause at least one output device to output human-perceivable interactive social behavior relating to the journey, for example, audio, video, or mechanical output providing educational or tour information, historical, cultural and entertainment information about the current location or event (see also process 710 in FIG. 6). At 756, 758 and 760. The one or more processors determine whether to output an audio output, a video output, a mechanical output, or a combination thereof. The processes 756, 758 and 760 may be performed in any order and combination, or substantially simultaneously. At 756, if an audio output is determined, the one or more processors send an audio signal to an audio transducer. At 758, if a video output is determined, the one or more processors send a video signal to a display device. At 760, if a mechanical output is determined, the one or more processors send a motor signal to a motor controller.

Figure 8:
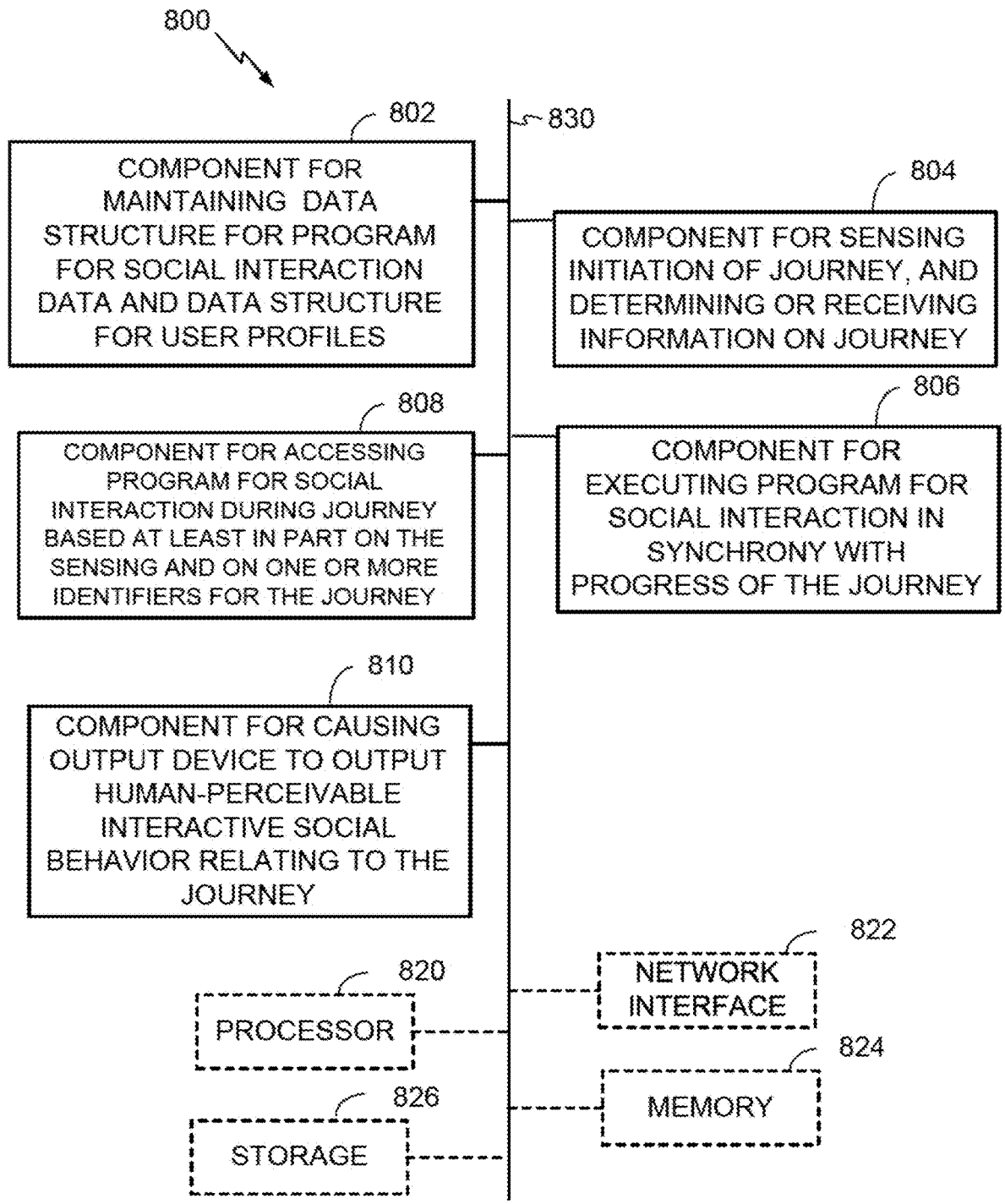
FIG. 8 is a conceptual block diagram illustrating components of an apparatus or system for the method as shown in FIG. 6.

FIG. 8 is a conceptual block diagram illustrating components of an apparatus or system 800 for providing entertainment experiences in a moving vehicle as described herein, according to one embodiment. As depicted, the apparatus or system 800 may include functional blocks that can represent functions implemented by a processor, software, or combination thereof (e.g., firmware).

As illustrated in FIG. 8, the apparatus or system 800 may comprise an electrical component 802 for maintaining data structure for program for non-navigational social interaction data and data structure for user profiles in one or more databases. The component 802 may be, or may include, a means for said maintaining. Said means may include the processor 820 coupled to the memory 824, storage 826 which may store the one or more databases, and to the network interface 822, the processor executing an algorithm based on program instructions stored in the memory. Such algorithm may include a sequence of more detailed operations, for example, as described in connection with block 702 of FIG. 6 above.

The apparatus or system 800 may further comprise an electrical component 804 for sensing initiation of a journey and determining or receiving information on the journey. The component 804 may be, or may include, a means for said sensing, receiving and determining. Said means may include one or more sensors as described herein, the processor 820 coupled to the memory 824, storage 826, and to the network interface 822, the processor executing an algorithm based on program instructions stored in the memory. Such algorithm may include a sequence of more detailed operations, for example, receiving sensor signal via one or more sensors indicating the vehicle's engine started, or the vehicle started to move, or signal from an application or from another in-vehicle device, as described in connection with block 704 of FIG. 6 above.

The apparatus or system 800 may further comprise an electrical component 806 for accessing program for non-navigational social interaction with one or more passengers during the journey based at least in part on the sensing and on one or more identifiers for the journey. The component 806 may be, or may include, a means for said accessing. Said means may include the processor 820 coupled to the memory 824, storage 826, and to the network interface 822, the processor executing an algorithm based on program instructions stored in the memory. In an aspect, the information may be received from external systems via the network interface 822. Such algorithm may include a sequence of more detailed operations, for example, as described in connection with block 706 of FIG. 6 above.

The apparatus or system 800 may further comprise an electrical component 808 for executing a program for non-navigational social interaction in synchrony with progress of the journey. The component 808 may be, or may include, a means for said executing. Said means may include the processor 820 coupled to the memory 824, storage 826, and to the network interface 822, the processor executing an algorithm based on program instructions stored in the memory. Such algorithm may include a sequence of more detailed operations, for example, as described in connection with block 708 of FIG. 6 above.

The apparatus or system 800 may further comprise an electrical component 810 for causing at least one output device to output human-perceivable interactive social behavior relating to the journey. The component 808 may be, or may include, a means for said causing. Said means may include the processor 820 coupled to the memory 824, storage 826, and to the network interface 822, the processor executing an algorithm based on program instructions stored in the memory. Such algorithm may include a sequence of more detailed operations, for example, as described in connection with block 710 of FIG. 6 above.

As shown, the apparatus or system 800 may include a processor component 820 having one or more processors, which may include a digital signal processor. The processor 820, in such case, may be in operative communication with the modules 802-810 via a bus 830 or other communication coupling, for example, a network. The processor 820 may initiate and schedule the functions performed by electrical components 802-810.

In related aspects, the apparatus or system 800 may include a network interface module 822 operable for communicating with any external storage device, with external systems or servers, or connected vehicles over a computer network. In further related aspects, the apparatus or system 800 may optionally include a module for storing information, such as, for example, a memory device/module 824. The computer readable medium or the memory module 824 may be operatively coupled to the other components of the apparatus 800 via the bus 830 or the like. The memory module 824 may be adapted to store computer readable instructions and data for effecting the processes and behavior of the modules 802-810, and subcomponents thereof, or the processor 820, or one or more steps of the method 700 or the method 1800 described in connection with FIG. 18. The memory module 824 may retain instructions for executing functions associated with the modules 802-810. While shown as being external to the memory 824, it is to be understood that the modules 802-810 can exist within the memory 824.

In another aspect, animated imagery and/or audio output is provided on a vehicle exterior at controlled times. Vehicle customization and expressions of pop culture and social interests have continued to gain traction since the appearance of the "bumper sticker." With the rollout of AVs, a new distribution avenue is created to express and share interests with a pool of people within the same geographical area without becoming a distracting road hazard. To mitigate hazards, an AV's gestures further communicates its intention in a friendly manner. In addition, a vehicle can emit a warning gesture to other AVs and pedestrians when a safety hazard is observed.

A processor may generate and display these types of exterior communications on the exterior of the AV. The content displayed may either pull data from a shared network of other AVs using a Venn Diagram of shared social interests at a specific location, by using a preset user preferred selection, through a promotional branded offering, or based on any other desired combination of input factors.

Branded Content displayed on the AV's exterior may be available for promotional use to promote an upcoming release and/or product. For example, if a new DC film is about to released, and two AV's pass each other who both happen to be DC fans, one AV may have the mood skin of Batman's face mask emitting light while the other AV has dark light emitting resembling the Batmobile.

For example, the user may use a touch screen display located inside the vehicle to select which mode or skin they would like their vehicle to emit, for example, a character from a motion picture (e.g. Batman, The Flash, Teen Titans, Aquaman). As the vehicle is turned on and starts progressing down a street, it may reflect a stationary Batman mask. However, if another vehicle merges too close to an AV displaying a 'Batman' skin, the first AV may either automatically (through the AI object detection machine based learning algorithm), decide to gesture a "Watch Out" visual in Batman's facial expression to communicate to the other "at fault" party. In an alternative, or in addition, the processor may alert the passenger the potential safety hazard and accept an instruction to deliver a visual warning to the other party or vehicle.

Figure 9:
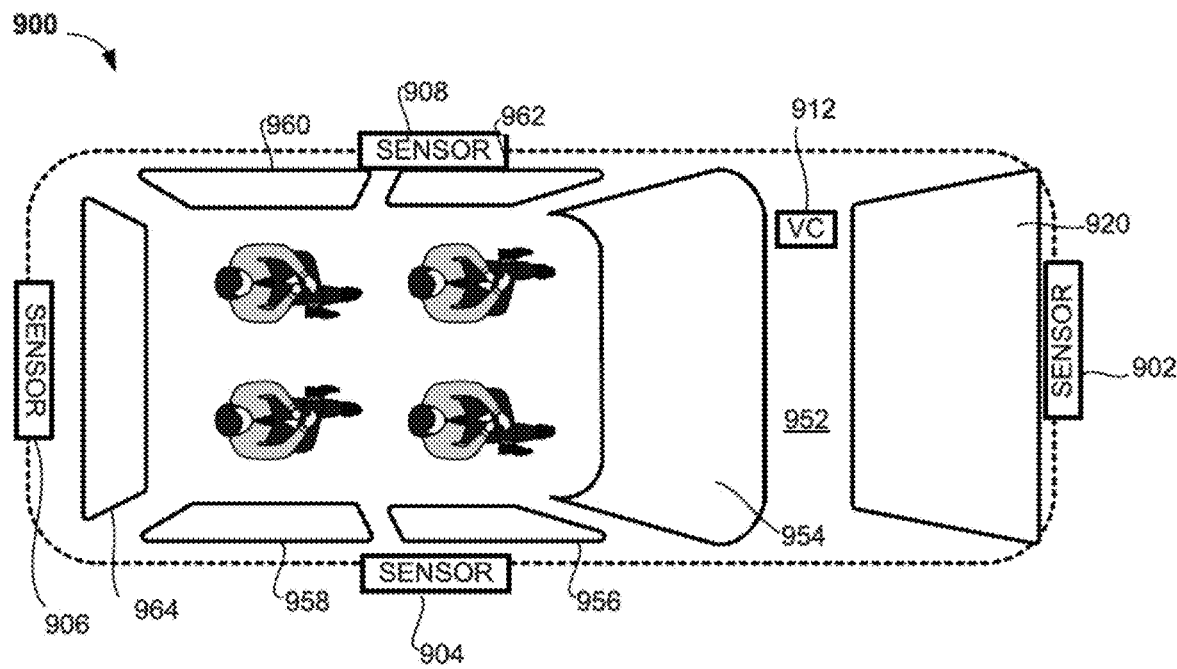
FIG. 9 is conceptual block diagram showing an apparatus for outputting human-perceivable exterior communication on a moving vehicle for communicating to neighboring vehicles and/or pedestrians.

Referring to FIG. 9, an apparatus is shown for outputting human-perceivable exterior communication on a moving vehicle for communicating to neighboring vehicles and/or pedestrians. In an aspect, the apparatus may include one or more processor located interior to the vehicle and one or more display located exterior to the vehicle. In an aspect, the apparatus may include an electronic display that offer saturated controllable light for exterior surfaces that are visible during broad daylight or at nighttime. For example, the apparatus may include an Organic Light-Emitting Diodes ("OLED") (or comparable LED) display 920 and/or screen or LED lighting systems that offer saturated controllable light for exterior surfaces during broad daylight. In some implementations, the electronic display may interface with a projector (e.g., a rear focused projector) placed within the vehicle.

In an aspect, the exterior display may include an OLED (or comparable LED) screen 920 to be molded onto the exterior 952 of the vehicle. Some implementations of this device makes it possible to reach dark black levels from ultra-thin screens and can include an additional white pixel along the red, green and blue sub-pixels to deliver a variety of colors. OLED's are also lighter, thinner and have greater picture quality that delivers contrast and depth. Additionally, OLED screens may be flexible and can be curved, and rolled up. This feature may be advantageous when integrating the OLED screen into the exterior 952 of a curved surface of the vehicle.

In an aspect, the exterior display 920 may include Quantum-Dot Light-Emitting Diodes ("QLED") screen or a color changing LED panel lighting system that offers high intensity colored light viewable in broad daylight may be installed on the exterior of the vehicle.

The vehicle may include one or more sensors, for example, sensor 902 toward the front (anterior), sensors 904 and 908 on the sides, and sensor 906 toward the rear (posterior). In an aspect, the sensors may include cameras and/or motion detectors. The sensors provide input about external objects in proximity to the vehicle to the apparatus. In an aspect, the proximity may be predefined. The apparatus may also use GPS navigation for input about external objects in proximity to the vehicle.

In an aspect, the apparatus may also include one or more display monitor positioned in the interior of the vehicle. For example, display device 954 toward the front, display devices 956, 958, 960 and 962 on the sides, and display devices 964 toward the rear. These display devices may be similar to screens 452-462 described in FIG. 4B. The apparatus may display the external object(s), or information on the external object(s) on the one or more display devices.

In an aspect, the apparatus may also include one or more audio speakers (not shown) strategically positioned such that their audio output will be audible to passengers in the neighboring vehicle(s) and/or pedestrians, further discussed in connection with FIG. 10D. In an aspect, the one or more processor or the apparatus may be, or may part of the vehicle controller 902.

Figure 10A:
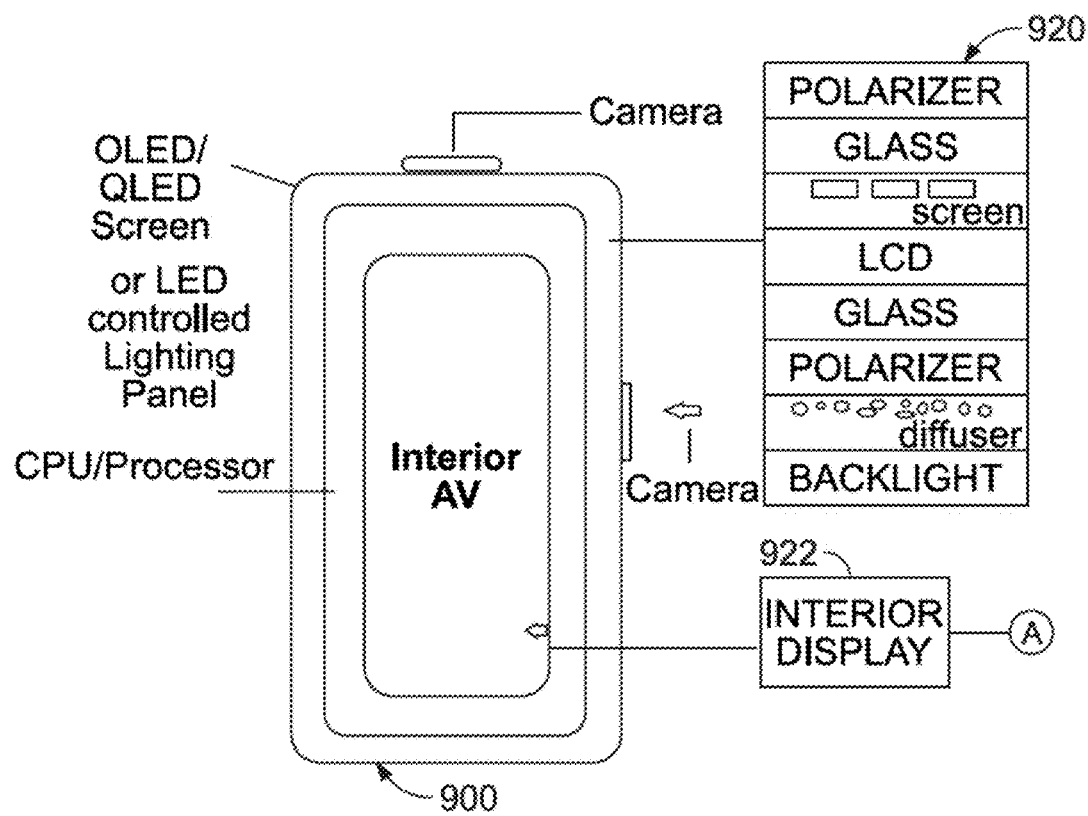
FIG. 10A is a conceptual block diagram illustrating aspects of an exemplary layer composition of a display surface on an exterior of a vehicle.

FIG. 10A shows an example composition of the display screen 920, comprising stacked layers including a backlight, a diffuser, one or more polarizers, one or more glass, polymer or crystal separators or protective layers, and LCD layer, a screen layer for pixel definition. In an OLED device, the LCD layer may be replaced by an emissive LED layer and the backlight layer omitted. The layers may be modified or omitted, and additional layers added, as known in the art of display screens. A user interface, for example a touchscreen, may be positioned inside the vehicle 900 as an auxiliary interior display 922. In an alternative, or in addition, a touchscreen controller may be added to a main display 954 to permit user input, or a microphone may be used for audio input. The interior display 922 may output control options for selection by a user.

Figure 10B:
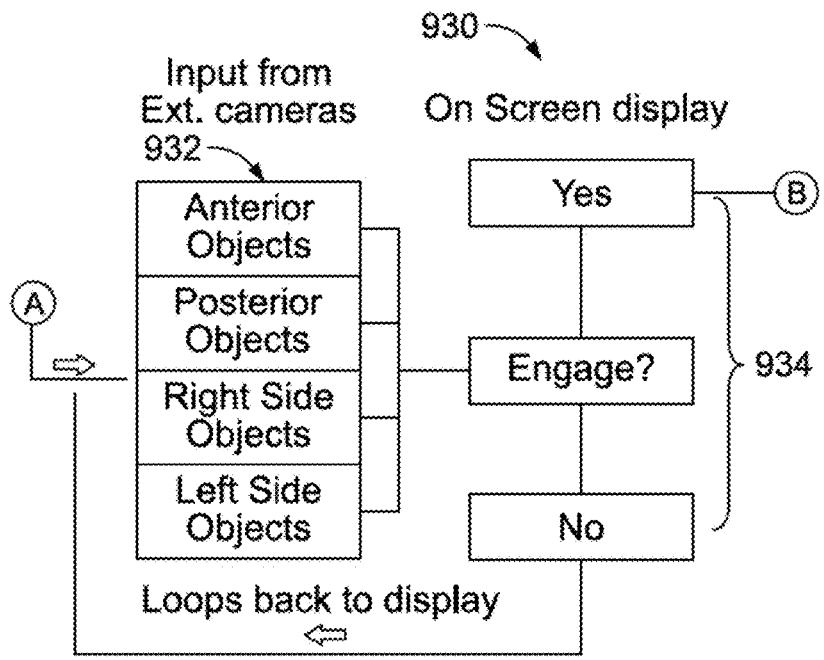
FIG. 10B is a conceptual block diagram illustrating aspects of a user interface for controlling an exterior display.

FIG. 10B shows an example of a control option display 930 on an interior monitor 922, displaying external object(s) 932 detected in the surrounding areas in proximity to the vehicle. The display 930 may include options 934 for enabling user input of an "engage" or "ignore" (do not engage) options in response to external video. In an alternative, an automatic algorithm based on predetermined rules, machine learning, or both.

Figure 10C:
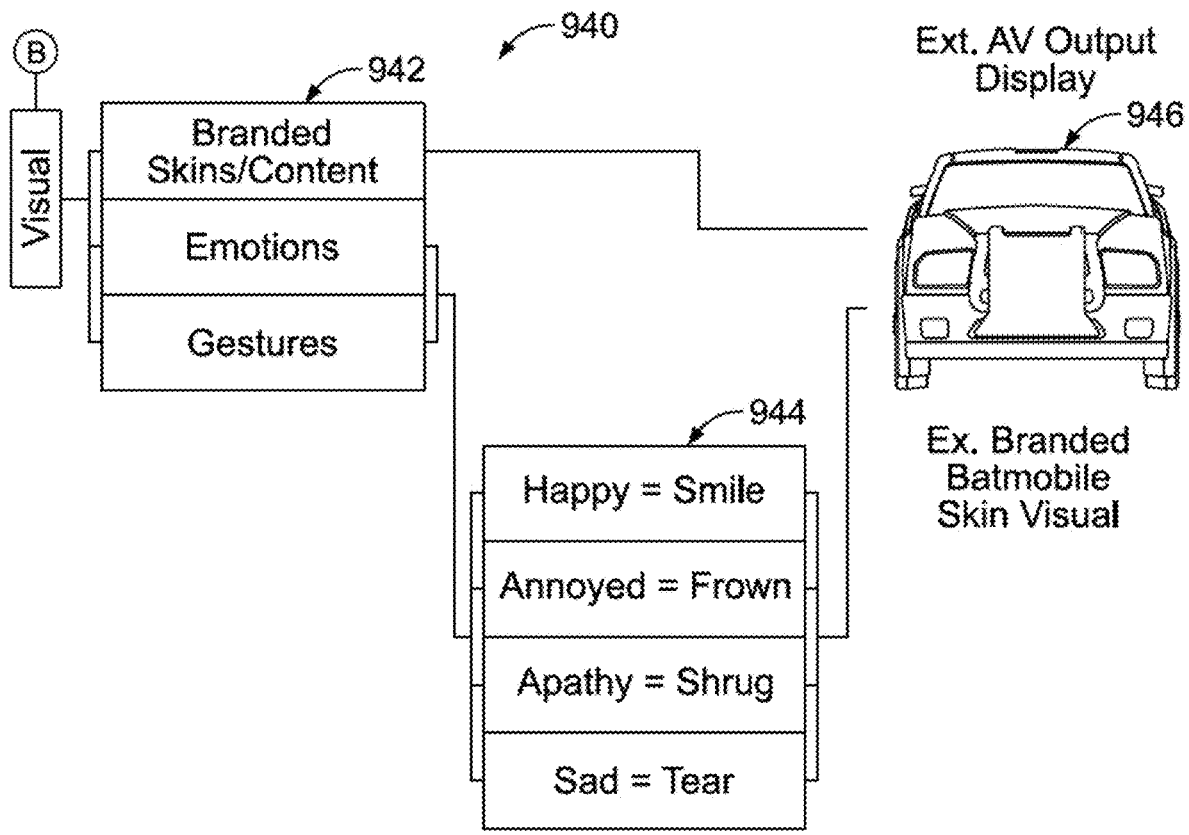
FIG. 10C is a conceptual block diagram illustrating aspects of display options for an exterior display.

FIG. 10C portrays a further display layout 940 providing the user with a choice to interact with objects outside of the vehicle. The user may either manually decide to interact with the images through the display skin 946 of the AV 900 based on the internal display's preset selection of visual choices 942 (e.g. Branded Skins, emotions, or gestures). The processor may provide more detailed options 944 for motions and gestures, for example, a smile, frown, shrug, tear, and so forth. In an alternative, or in addition, the vehicle processor may cause the external display 946 to operate and communicate independently based on AI machine-based learning behaviors. In the illustrated example, the communication possibilities are divided into four sets of categories 944: Happy, Annoyed, Apathetic and Sad. Additional and different emotional categories 944 may also be defined. In an aspect, available categories may vary depending on user preferences and type of external stimuli that the response is intended for. For example, response categories 944 may differ depending on whether the intended targets are primarily pedestrians, people in other vehicle, another driver, friends, acquaintances or strangers, and so forth.

The output display may include, for example, a branded skin 946 selected based on the type of social interaction that is desired. For example, for promotional or recreational purposes, a branded skin (e.g. Batman's face mask), may be displayed on the display 920 on the exterior of the AV.

Figure 10D:
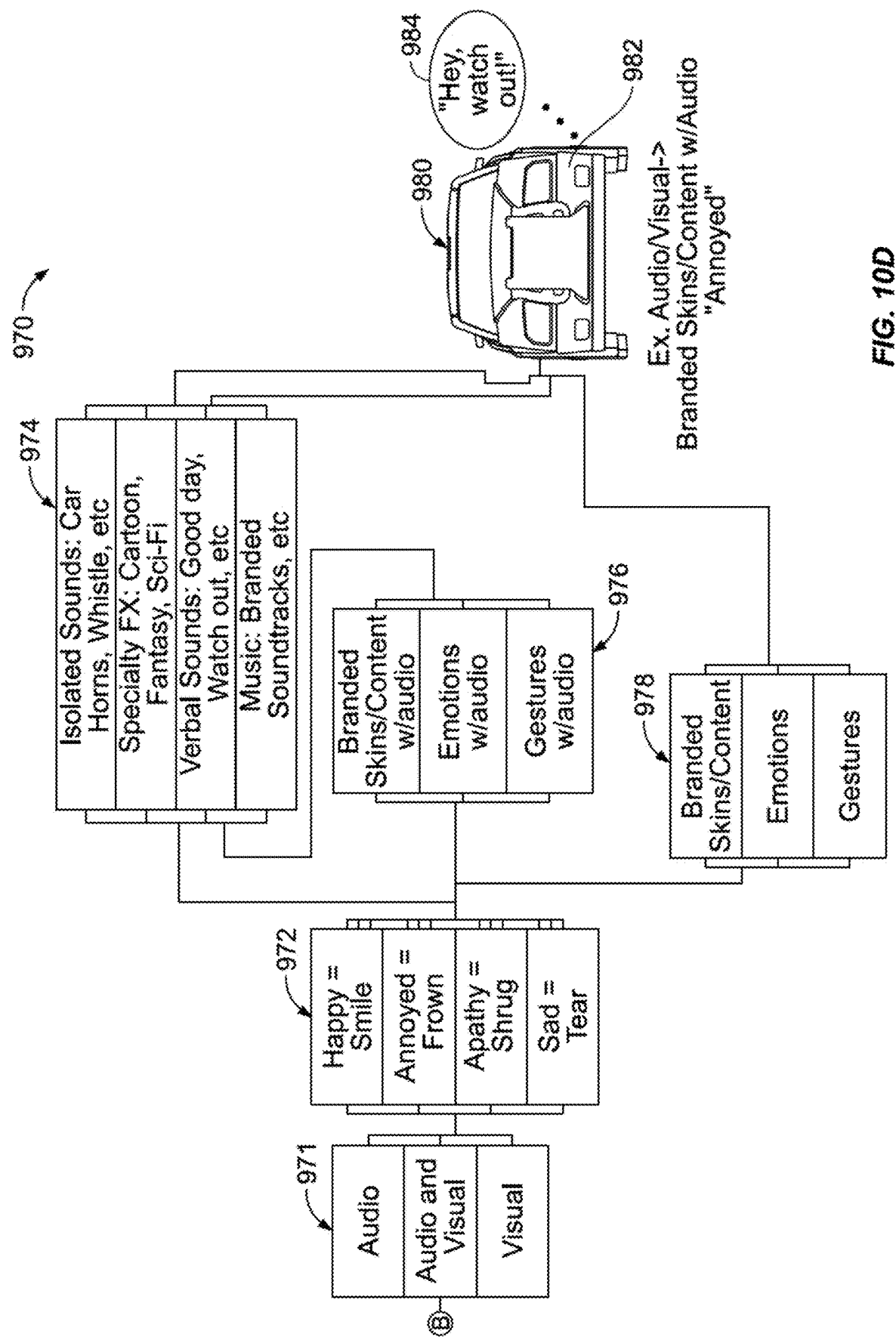
FIG. 10D is a conceptual block diagram illustrating examples of output categories for human-perceivable exterior communication skin and gestures, including audio or video output.

FIG. 10D shows a similar example using multiple output modes 971 including audio, visual, or audio-visual output. The categories 972 are the same as shown in FIG. 10C and similar considerations apply, e.g., reaction output category 972 may include Happy, Annoyed, Apathetic and Sad. The vehicle processor may output human-perceivable exterior communication images and gestures that can be display on and outputted from on a moving vehicle for communicating to neighboring vehicles and/or pedestrians. The categories may include programmed audio, visual, or audio-visual output. For example, the apparatus may associate the Happy reaction with a Smile visual gesture, Annoyed with a frown visual gesture, Apathy with a shrug visual gesture, and Sad with a tear visual gesture, adding sound effects and speech as appropriate.

In an aspect, the vehicle processor may associate the reaction category 972 to a sound category 974, a combination category 976 of combined visual and audio communications, and a visual image category 978. In an aspect, based on the reaction, which can be manually selected by a passenger or determined by an AI algorithm, the apparatus may calculate and navigate through the associated categories to output the intended exterior communication. As an example, when reaction at vehicle 980 is Annoyed, the apparatus may adjust the skin image with a face of Batman to show a frown 982 as well as outputting the sound "Hey, watch out!" 984.

Accordingly, the foregoing may be used to accomplish placement, manipulation and configuration of an OLED and/or QLED/LED display to the exterior of an AV with a built in rear focused light projector or LED panel lighting to display a variety of colorful expressive exteriors in the form of smiles, scowls, waves or other humanlike gestures to communicate with other AV's and pedestrians. External camera sensors placed on the exterior of the AV track, capture and display exterior objects (e.g vehicles, pedestrians), and casts them to internal monitors located inside the AV. Once displayed on an internal screen, an object detection algorithm allows a passenger control over engagement either through manual selection from a set of preset options of audio and/or visual communications, or the AV may use machine based AI learning to determine what types of external communications are needed throughout the course of travel.

Figure 11:
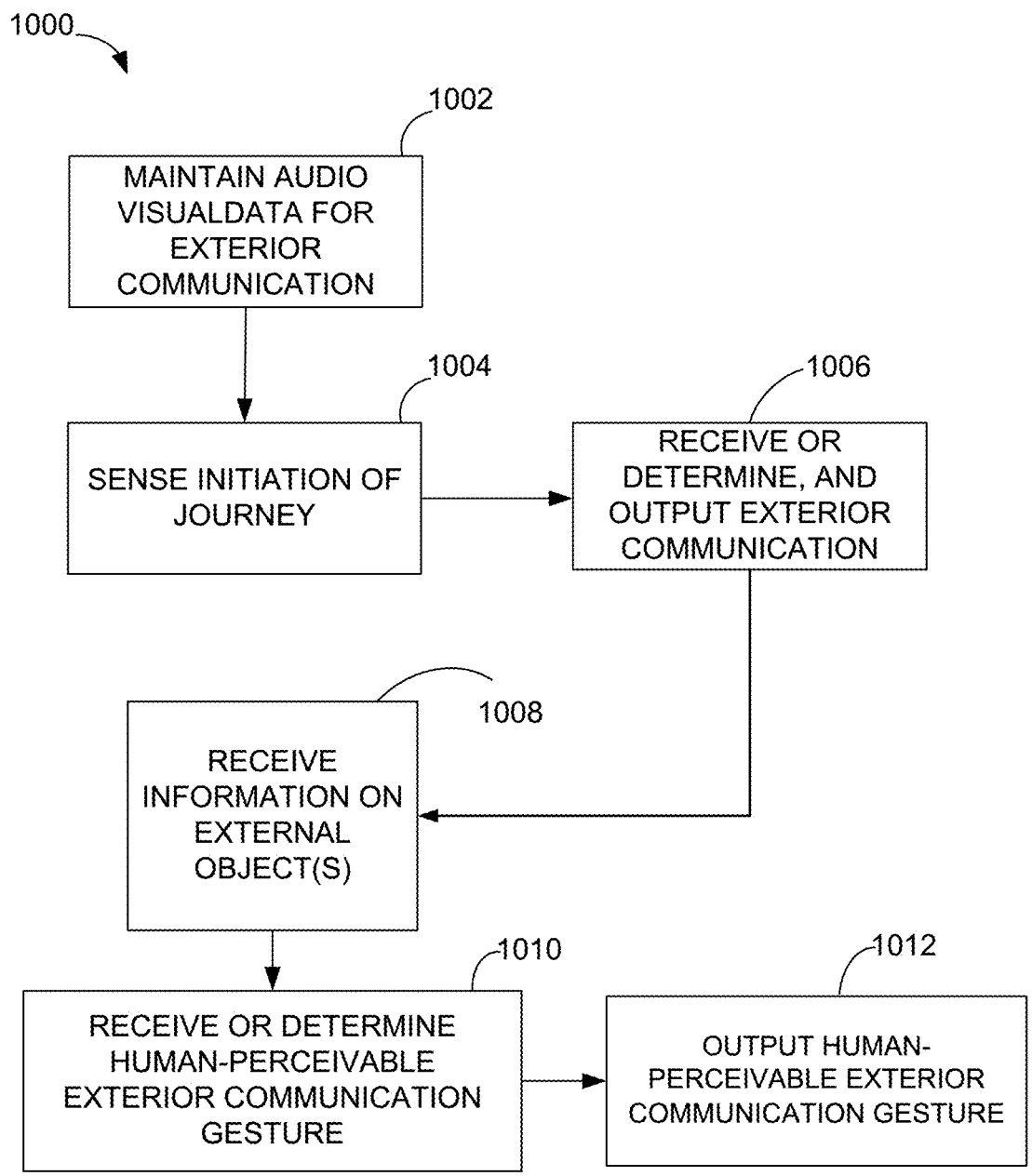
FIG. 11 is a conceptual block diagram illustrating an overview of outputting human-perceivable exterior communication on a moving vehicle for communicating to neighboring vehicles and/or pedestrians.

FIG. 11 shows an overview 1000 of outputting human-perceivable exterior communication on a moving vehicle for communicating to neighboring vehicles and/or pedestrians. The method 1000 may be performed by one or more computer processors in the vehicle. At the process 1002, the one or more processors maintain data structure of audio visuals for exterior communications. In an aspect, the audio-visual data may include branded content for promotional use, content based on user preferences, and/or content for use by machine-based AI object detection algorithms. In an aspect, the data may be downloaded from a remote server external to the vehicle.

At the process 1004, the one or more processors sense the initiation of a journey. In an aspect, the sensing may include receiving information, for example, indicating the starting of the engine of the vehicle, the movement of the vehicle along a route, or from user input. At the process 1006, the one or more processors receive or determine, and output one or more exterior communication outputs. At this time, the exterior output may include a "skin" image for display on the exterior display of the vehicle. In an aspect, the skin image may be a branded image for promotional use, or an image based on user preferences.

At the process 1008, the one or more processors receive information about external object(s) in proximity of the vehicle. The information may include images of neighboring vehicles or pedestrians. At the process 1010, as described in further detail in FIGS. 10A to 14, the one or more processors may display the information about the external object(s), and receive a human-perceivable exterior communication selected by a passenger to output, in reaction to the information about the external object(s). In an aspect, the one or more processors may determine, using machine-based AI object detection algorithms, the human-perceivable exterior communication in reaction to the information about the external object(s). The human-perceivable outputs may include visual display, or audio output, or audio together with visual output. At the process 1012, the one or more processors output the human-perceivable exterior communication.

Figure 12:
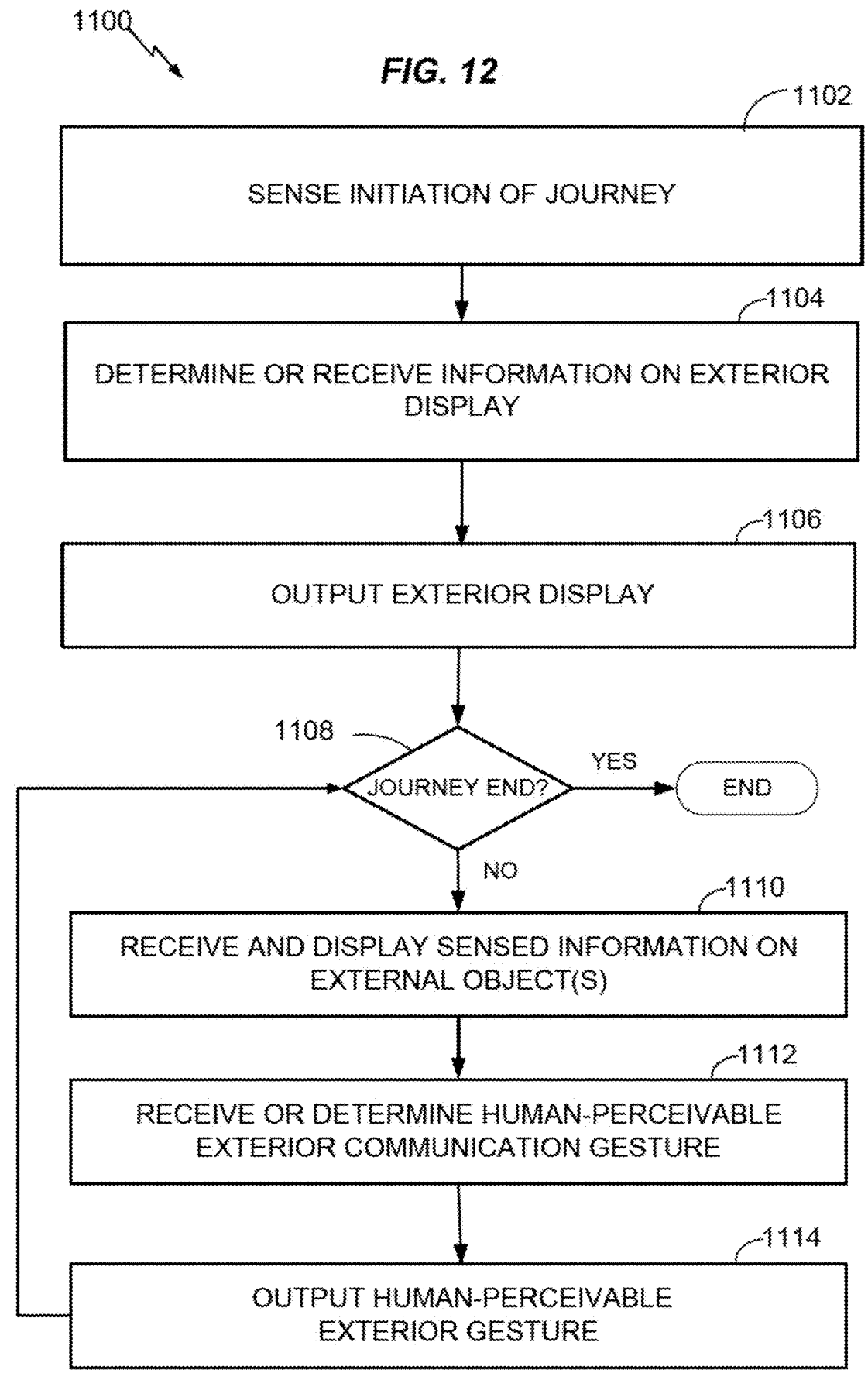
FIG. 12 shows a diagram for outputting human-perceivable exterior communication on a moving vehicle for communicating to neighboring vehicles and/or pedestrians.

FIG. 12 illustrates a useful automatic process 1100 for outputting human-perceivable exterior communication on a moving vehicle for communicating to neighboring vehicles and/or pedestrians. The method 1100 may be performed by one or more computer processors in the vehicle. The processes 1104 to 1106 may be like the processes 1002 to 1006 in FIG. 11. At the process 1102, the one or more processors sense the initiation of a journey. At the process 1104, the one or more processors receive or determine one or more exterior communication outputs. At this time, the exterior output may include a "skin" image for display on the exterior display of the vehicle. At the process 1106, the one or more processors output the exterior communication, or skin. As the vehicle progresses on the journey, wherein determining at the process 1108 that the journey has not ended, the one or more processors receive, at the process 1110, information about external object(s) in proximity of the vehicle.

Figure 13:
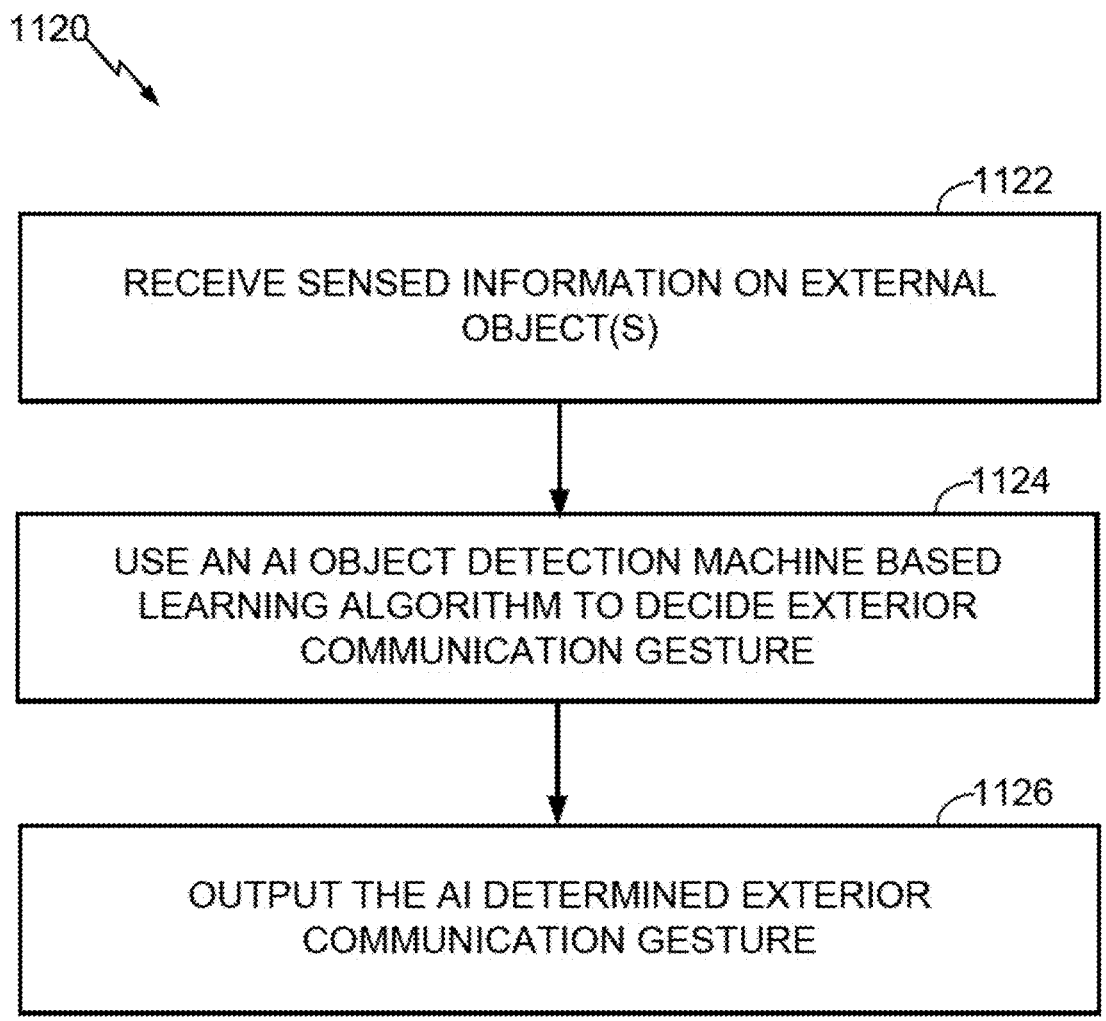
FIG. 13 shows a useful automatic process using AI object detection algorithm for outputting human-perceivable exterior communication on a moving vehicle for communicating to neighboring vehicles and/or pedestrians.
Figure 14:
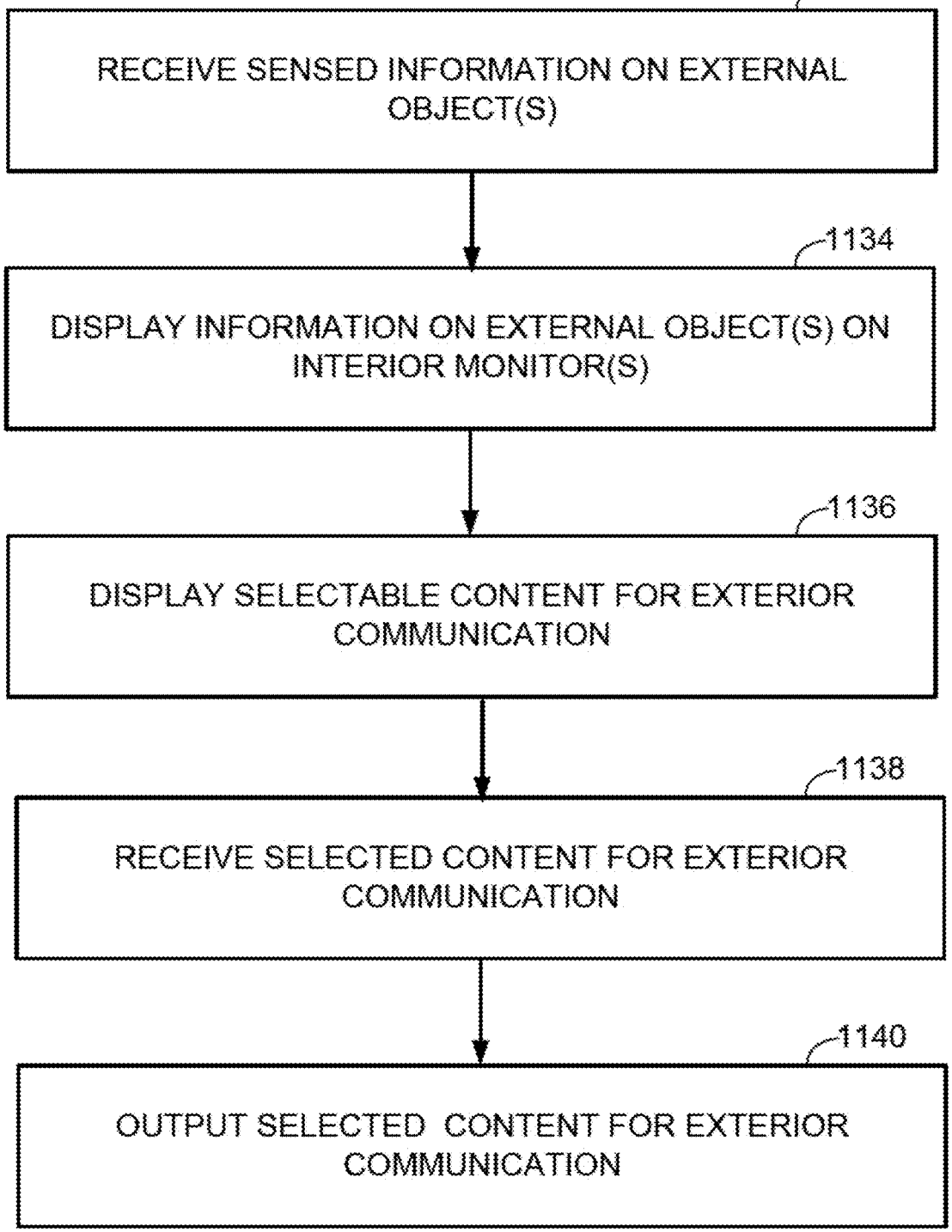
FIG. 14 shows a useful automatic process using user selectable output for outputting human-perceivable exterior communication on a moving vehicle for communicating to neighboring vehicles and/or pedestrians.

At the process 1112, in an aspect, as described in further detail in FIG. 14, the one or more processors receive a selected human-perceivable exterior communication gesture. In another aspect, as described in further detail in FIG. 13, the one or more processors determine/decide on a human-perceivable exterior communication gesture. And at the process 1114, the one or more processors output the selected human-perceivable exterior communication gesture. For example, the one or more processors produce a sound, or display an emotional image on the exterior display, or both. FIG. 10D shows more examples of selectable outputs.

FIG. 13 illustrates a useful automatic process 1120 for outputting human-perceivable exterior communication on a moving vehicle for communicating to neighboring vehicles and/or pedestrians. The method 1120 may be performed by one or more computer processors in the vehicle. Similar to the process 1110, at the process 1122, the one or more processors receive, and optionally display, information about external object(s) in proximity of the vehicle. At the process 1124, the one or more processors use a machine-based AI object detection learning algorithm to identify (e.g., recognize) and analyze the external object(s) and decide whether a human-perceivable exterior gesture should be output. At the process 1126, the one or more processors output the AI decided human-perceivable exterior communication.

FIG. 14 illustrates another useful automatic process 1130 for outputting human-perceivable exterior communication on a moving vehicle for communicating to neighboring vehicles and/or pedestrians. Like the process 1122, at the process 1132, the one or more processors receive information about external object(s) in proximity of the vehicle. In an aspect, at the process 1134, the one or more processors display information about external object(s) on one or more of the internal monitors inside the vehicle, to inform or alert the passenger(s) to the external object(s), for example an approaching vehicle or pedestrian which are in close proximity to the vehicle. In an aspect, at the process 1136, the one or more processors may also display selectable human-perceivable exterior communication gestures that the passenger(s) may select in reaction to the external object(s). For example, a selectable exterior communication gesture may be an audio to alert the approaching vehicle that it is too close, or an annoying image, or both. At the process 1138, the one or more processors receive a selected exterior communication gesture. And at the process 1140, the one or more processors output the selected exterior communication gesture.

Figure 15:
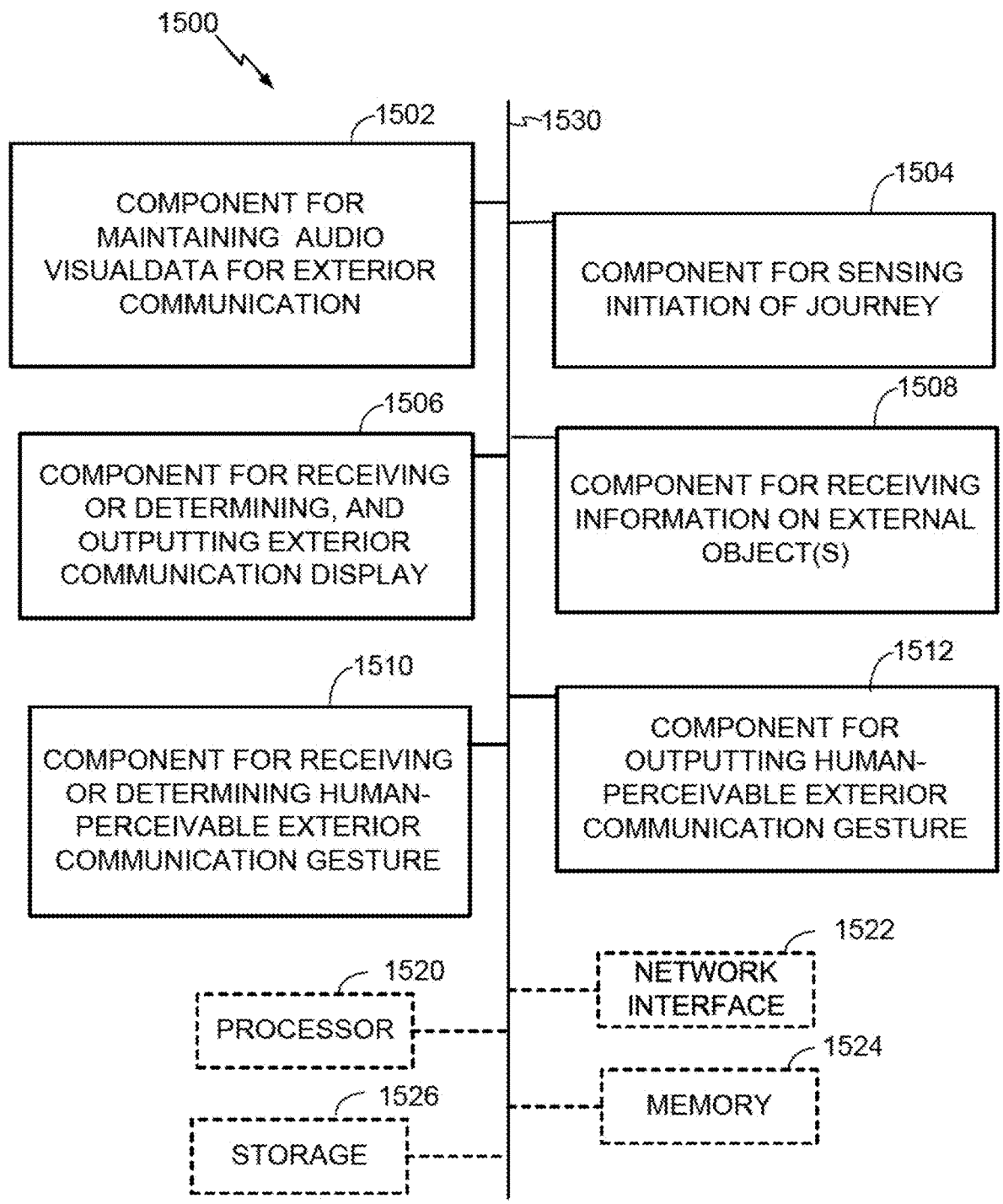
FIG. 15 is a conceptual block diagram illustrating components of an apparatus or system for the method as shown in FIGS. 12-14.

FIG. 15 is a conceptual block diagram illustrating components of an apparatus or system 1500 for outputting human-perceivable exterior communication on a moving vehicle for communicating to neighboring vehicles and/or pedestrians as described herein, according to one embodiment. As depicted, the apparatus or system 1500 may include functional blocks that can represent functions implemented by a processor, software, or combination thereof (e.g., firmware).

As illustrated in FIG. 15, the apparatus or system 1500 may comprise an electrical component 1502 for maintaining data structure for audio-visual communications in one or more databases. The component 1502 may be, or may include, a means for said maintaining. Said means may include the processor 1520 coupled to the memory 1524, storage 1526 which may store the one or more databases, and to the network interface 1522, the processor executing an algorithm based on program instructions stored in the memory. Such algorithm may include a sequence of more detailed operations, for example, maintaining branded content for promotional use, content based on user preferences, and/or content for use by machine-based AI object detection algorithms, as described in connection with block 1002 of FIG. 11 above.

The apparatus or system 1500 may further comprise an electrical component 1504 for sensing the initiation of a journey. The component 1504 may be, or may include, a means for said sensing. Said means may include one or more sensors as described herein, the processor 1520 coupled to the memory 1524, storage 1526, and to the network interface 1522, the processor executing an algorithm based on program instructions stored in the memory. Such algorithm may include a sequence of more detailed operations, for example, receiving sensor signal via one or more sensors indicating the vehicle's engine started, or the vehicle started to move, or signal from an application or from another in-vehicle device, as described in connection with block 1004 of FIG. 11 and block 1102 of FIG. 12 above.

The apparatus or system 1500 may further comprise an electrical component 1506 for receiving or determining, and outputting exterior communication display. The component 1506 may be, or may include, a means for said receiving or determining, and outputting. Said means may include the processor 1520 coupled to the memory 1524, storage 1526, and to the network interface 1522, the processor executing an algorithm based on program instructions stored in the memory. Such algorithm may include a sequence of more detailed operations, for example, receiving or determining, and outputting a "skin" image for display on the exterior display of the vehicle, as described in connection with block 1006 of FIG. 11 and block 1106 of FIG. 12 above.

The apparatus or system 1500 may further comprise an electrical component 1508 for receiving information on external objects. The component 1508 may be, or may include, a means for said receiving. Said means may include the processor 1520 coupled to the memory 1524, storage 1526, and to the network interface 1522, the processor executing an algorithm based on program instructions stored in the memory. Such algorithm may include a sequence of more detailed operations, for example, receiving images of neighboring vehicles or pedestrians, as described in connection with block 1008 of FIG. 11, block 1110 of FIG. 12, block 1122 of FIG. 13 and block 1132 of FIG. 14 above.

The apparatus or system 1500 may further comprise an electrical component 1510 for receiving or determining human-perceivable exterior communication gestures. The component 1510 may be, or may include, a means for said receiving or determining. Said means may include the processor 1520 coupled to the memory 1524, storage 1526, and to the network interface 1522, the processor executing an algorithm based on program instructions stored in the memory. Such algorithm may include a sequence of more detailed operations, for example, receiving a human-perceivable exterior communication gesture selected by a passenger or determining, using machine-based AI object detection algorithms, the human-perceivable exterior communication gesture, as described in connection with block 1010 of FIG. 11, block 1112 of FIG. 12, block 1124 of FIG. 13 and block 1138 of FIG. 14 above.

The apparatus or system 1500 may further comprise an electrical component 1512 for outputting the human-perceivable exterior communication gestures. The component 1512 may be, or may include, a means for said outputting. Said means may include exterior display, speakers, the processor 1520 coupled to the memory 1524, storage 1526, and to the network interface 1522, the processor executing an algorithm based on program instructions stored in the memory. Such algorithm may include a sequence of more detailed operations, for example, outputting an isolated sound, visual image(s) or a combination thereof, as described in connection with block 1012 of FIG. 11, block 1114 of FIG. 12, block 1126 of FIG. 13 and block 1140 of FIG. 14 above.

As shown, the apparatus or system 1500 may include a processor component 1520 having one or more processors, which may include a digital signal processor. The processor 1520, in such case, may be in operative communication with the modules 1502-1512 via a bus 1530 or other communication coupling, for example, a network. The processor 1520 may initiate and schedule the functions performed by electrical components 1502-1512.

In related aspects, the apparatus or system 1500 may include a network interface module 1522 operable for communicating with any external storage device, with external systems or servers, or connected vehicles over a computer network. In further related aspects, the apparatus or system 1500 may optionally include a module for storing information, such as, for example, a memory device/module 1524. The computer readable medium or the memory module 1524 may be operatively coupled to the other components of the apparatus 1500 via the bus 1530 or the like. The memory module 1524 may be adapted to store computer readable instructions and data for effecting the processes and behavior of the modules 1502-1512, and subcomponents thereof, or the processor 1520, or one or more steps of the methods 1000-1130. The memory module 1524 may retain instructions for executing functions associated with the modules 1502-1512. While shown as being external to the memory 1524, it is to be understood that the modules 1502-1512 can exist within the memory 1524.

Figure 16:
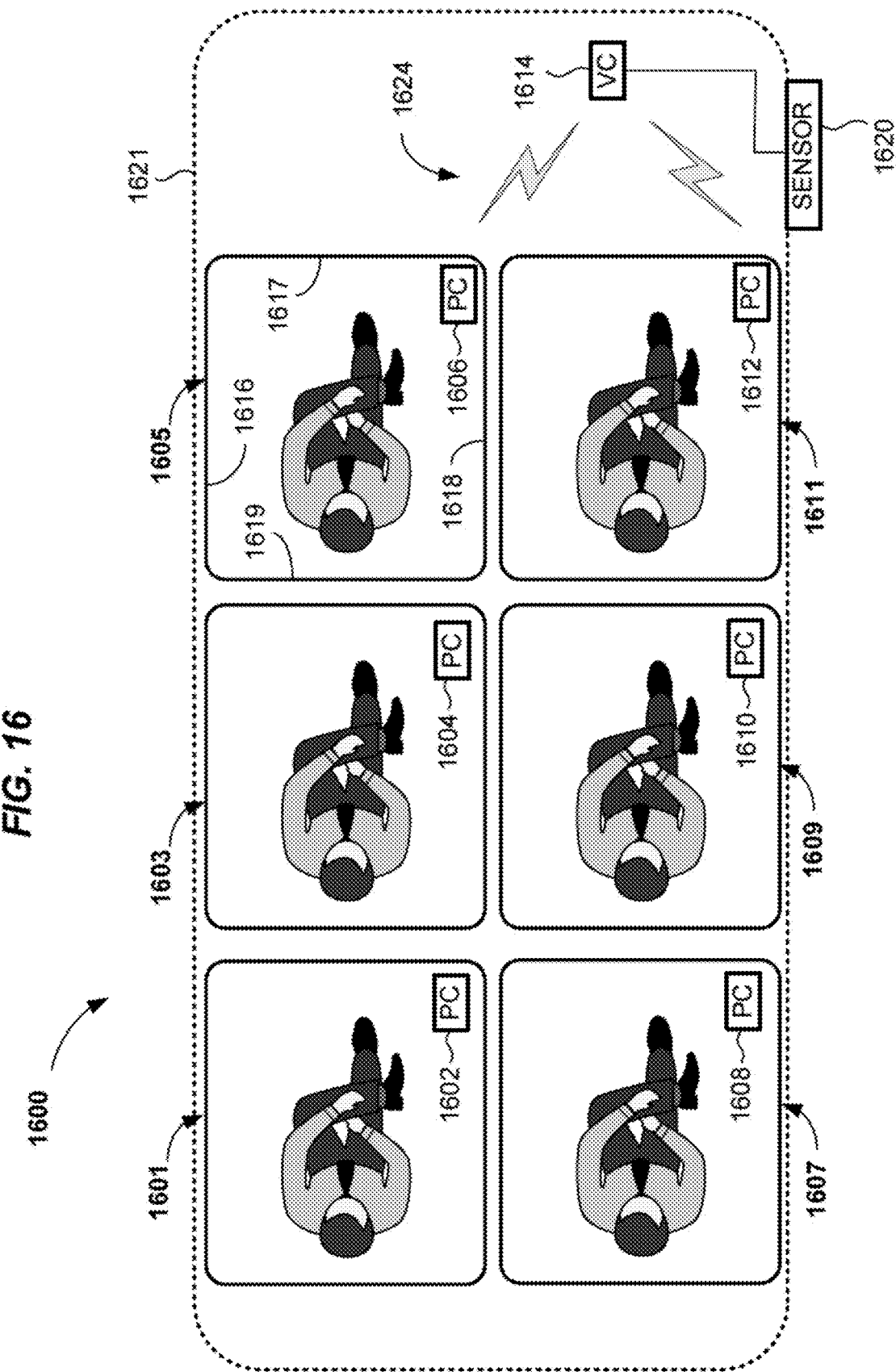
FIG. 16 is a conceptual block diagram illustrating, in plan view, components of an apparatus or system for controlling isolation pods in a motor vehicle.
Figure 17:
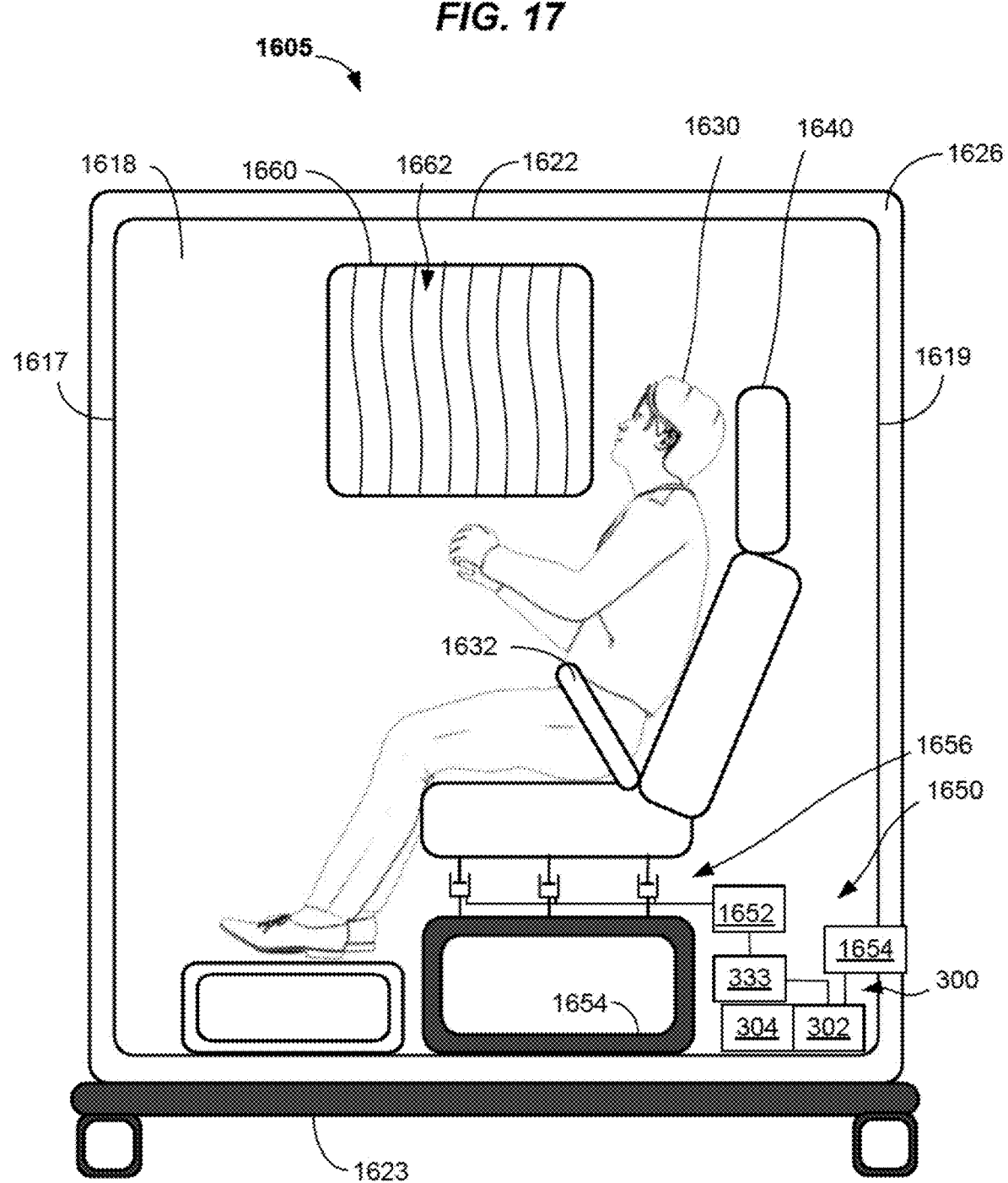
FIG. 17 is a conceptual block diagram illustrating, in side view, further components of an apparatus or system for controlling isolation pods in a motor vehicle.

FIG. 16 shows components of an apparatus or vehicular system 1600 for using or controlling isolation pods in a motor vehicle 1621. FIG. 17 shows additional components of the apparatus or system 1600, including further details of an isolation pod 1605. In the illustrated example, the vehicle 1621 is van designed to carry six isolation pods 1601, 1603, 1605, 1607, 1609, 1611. The vehicle 1620 may be autonomously piloted (as shown), may be designed for a human driver, or may support both autonomous and manual driving modes. The isolation pods may be built into and fixed to the vehicle 1621 or may be designed for insertion and removal into the van using handling equipment, manual or robotic, during ordinary operation. Although the isolation pods 1601, 1603, 1605, 1607, 1609, 1611 are shown as cuboids for illustrative simplicity, they may be shaped in various configurations to optimize interior use and exterior handling. For example, their front, side and upper surfaces may be curved and integrated into a seamless display surface that enhances immersive viewing. As illustrated, each isolation pod includes viewing panels separated by bends. For example, referring to pod 1605 in both FIGS. 16 and 17, an isolation pod 1605 enclosure may comprise a front panel 1617, a rear panel 1619, a right panel 1618, a left panel 1616, and a roof panel 1622, each configured for visual display (e.g., as an electronic display screen or projection surface for a video projector). The pod 1605 may include a structural floor 1623 that is not used for visual display.

The display panels 1616, 1617, 1618, 1619, and 1622 may be supported by walls made of any suitable combination of structural and sound-insulating materials. Each of the pods may be provided with a ventilation and climate control system, which may be configured for coupling to a ventilation and climate control system of the vehicle 1621. In an alternative, or in addition, each isolation pod may include an independent ventilation and climate control system for use in the vehicle or when separated from the vehicle. In some embodiments, the pods when separated from the vehicle can function as a sound and temperature-insulated entertainment pod in a stationary mode.

The vehicle 1621 may include a vehicle controller 1614 for communicating with and in some cases controlling digital content for presentation in each of the isolation pods 1601, 1603, 1605, 1607, 1609, 1611. Each of the pods may include a corresponding pod controller 1602, 1604, 1606, 1608, 1610 and 1612, each of which may be configured as a content player device 300 (FIG. 3) including provisions for content output (e.g., visual, audio, tactile, olfactory) as herein described. In addition to content control and output, each pod controller 1602, 1604, 1606, 1608, 1610 and 1612 may control a mechanical motion system for its corresponding pod. In an alternative, a vehicle controller 1614 may perform some or all functions of the pod controllers. The vehicle controller 1614 may be coupled to the pod controllers vial a wireless link 1624 or by a wire harness (not shown). The vehicle controller 1614 may be coupled to one or more sensors 1620 that provide signals indicating vehicle speed, location, external views, vibration, acceleration, noise, engine states, and other information which may be used as input to an output control process by the pod controllers. In addition, each of the pod controllers 1602, 1604, 1606, 1608, 1610 and 1612 and the vehicle controller may be coupled via their own wireless links (e.g., cellular digital data or satellite links) to a server 200 in a system 100 (FIGS. 1 and 2) in which the isolation pod controllers act as client devices capable of functions as herein described.

A client device (112, 114, 118, 120, 300, 1606) configured as a pod controller in an isolation pod may service output modalities that are enhanced by the pod's physical structure. For example, an isolation pod may be optimized for surround screen output, using projectors, LCD screens, or OLED screens. Surround screens may be used for immersive output and for new ways of displaying comics, games, live events or videos. For example, the surround screen modalities may include displaying simultaneous action on different panels, placing the viewer in the middle of action or scene (immersive); showing related story elements happening at different places and times (parallel narratives); showing alternative renderings or viewpoints for artistic effect (spatial layering); or scrolling time-coordinated past, present, future views across multiple panels or portions of a pod's surround screens (time scrolling).

In an aspect, an isolation pod 1605 may be used inside a vehicle or removed from a vehicle as a personal "escape room" for entertainment, work, study, meditation, online activity, exercise, competitive gaming, or rest. A larger, multi-passenger pod may function as a family entertainment room, a workplace meeting room, classroom, or exercise studio. In an alternative, virtual presence methods may be used to simulate a meeting room by digital communication and display between single-passenger pods. Social experiences in pods may include, for example sharing experiences from a day together, such as images and videos collected by mobile device application. In other embodiments, the isolation pod may be used to simulate an experience of being in an imaginary context, for example, a spaceship or superhero car, or a character in a drama.

Referring to FIG. 17, a seat 1640 or other passenger support in the isolation pod 1605, or the entirely of the isolation pod 1605, may be supported by a motion isolation and control frame 1654 driven by a motion control system 1650 controlled by a client device/pod controller 300/1606. The pod 1605 may be further equipped with "4D" output devices, e.g., tactile interfaces and aroma generators 377 for greater immersion. The client device/pod controller 300/1606 may include one or more output ports for driving portable equipment, for example, a tactile suit or vest, or a virtual reality headgear. In addition, or in an alternative, device/pod controller 300/1606 may include one or more output ports for driving a noise canceling audio system, or personalized seats and restraints. In an embodiment, the client device/pod controller 300/1606 may personalize displays and other outputs in the isolation pod 1605 based on user selections and inferred preferences.

Consistent with the foregoing, an isolation pod entertainment apparatus 1605 may include a sound-isolating enclosure 1626, a passenger seat 1640 with safety restraints 1632 for vehicular conveyance in the enclosure 1626, a transceiver 1654 for coupling to a computer network 100 exterior to the apparatus, one or more processors 300 coupled to the transceiver, at least one output device 1654, 320, and a memory 304 coupled to the at least one processor, the memory holding program instructions that when executed by the processor 302 cause the apparatus to perform certain operations. The operations may include, for example, identifying an occupant of the enclosure; obtaining digital content for play on the at least one output device, based at least in part on one or more of: an identity of the occupant, one or more first identifiers for a journey by a vehicle coupled to the apparatus, or one or more second identifiers for a stationary use of the apparatus; and outputting the digital content to the at least one output device. Further details of the digital content may be as described herein above for mobile and stationary client devices.

In an aspect, the at least one output device may include an immersive display on walls of the apparatus 1605 surrounding at least a portion of the passenger seat 1640. The at least one output devise may include adjacent panels.

The apparatus 1605, wherein the memory holds further program instructions that when executed by the processor cause the apparatus to perform at least one of placing simultaneous action on different panels or time coordinating past, present and future action scrolling across the adjacent panels 1616, 1617, 1618, etc.

The apparatus 1605 may further include at least one of a motion isolation system or simulation system including at least a frame 165 and actuators 1656 interposed between the passenger seat and the enclosure and driven by a control system 1650, and an output port 330 for a tactile output device for use by the occupant. The system 1656 may function as motion isolation and/or motion simulation, depending on control signals from the control system 1650. The control system 1650 may include a client device 300, a motion controller 333 for driving an electro-magnetic, hydraulic or pneumatic actuator system 1656 interposed between the passenger seat 1640 and the frame 1654. The system 1656 may be driven by a corresponding motor or pump controller 1652, e.g., an motor driver for an electrical motor or pump under control of the processor 302 via the controller 333. The processor 302 may produce higher-level signals (e.g., up, down, sideways) that the controller 333 translates into analog signals for driving a motor or pump.

The apparatus 1605 may further include an aroma generator 377 (FIG. 3) responsive to at least a portion of the digital content. In addition, the pod 1605 may include at least one door (not shown) for entry and egress of a passenger/user 1630, and suitable ventilation/climate control system (not shown).

In another aspect, at least one wall of the enclosure 1626 may be provided with shutters 1662 controlling transparency of a window 1660 under control of the one or more processors 302. The processor 302 may control transparency in response to user input, status of a game or other content, or other factors.

Figure 18:
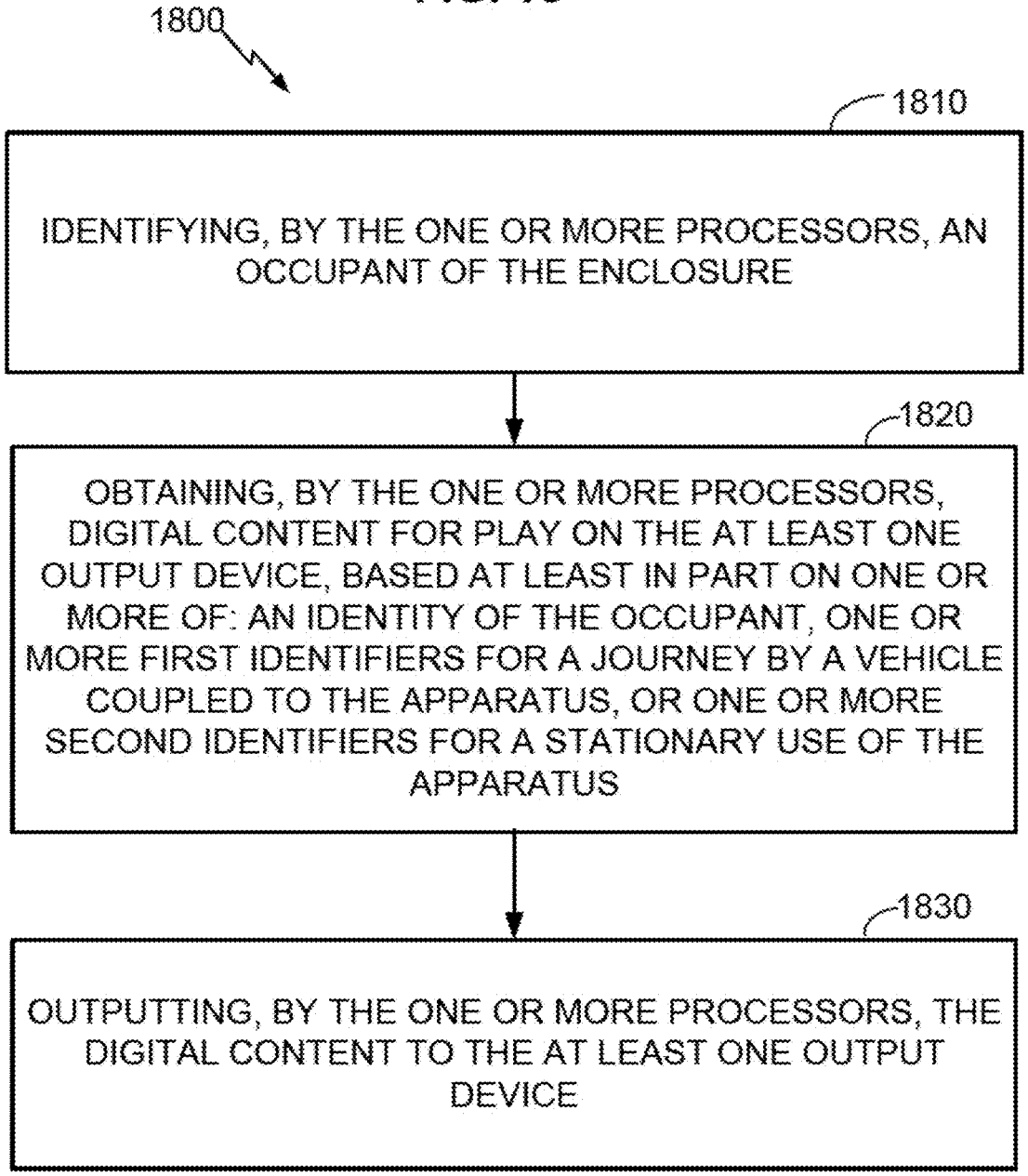
FIG. 18 is a flowchart illustrating aspects of controlling digital output and control of isolation pods as shown in FIGS. 16-17.

FIG. 18 is shows further aspects of controlling digital output and control of isolation pods as shown in FIGS. 16-17. A method 1800 for operating an apparatus including a sound-isolating enclosure, one or more processors, and at least one output device may include at 1810, identifying, by the one or more processors, an occupant of the enclosure. For example, the one or more processors may communicate via a wireless link to a mobile device registered to the occupant, may authentic the occupant using sensor input such as biometric image data (audio or visual), may request an account identifier and password, or some combination of the foregoing. Once the processor has identified the occupant, it may use the occupant identity to access content according to the occupant's rights of use and preferences.

The method may further include at 1820 obtaining, by the one or more processors, digital content for play on the at least one output device, based at least in part on one or more of: an identity of the occupant, one or more first identifiers for a journey by a vehicle coupled to the apparatus, or one or more second identifiers for a stationary use of the apparatus. The first identifiers may include information such as an origin, a destination, a trip purpose, a travel time, and identity of fellow travelers. In an alternative, or in addition, the second identifiers may include a purpose for a stationary use session, a location of the session, and a duration of the session. The one or more processors may execute a content selection protocol to select digital content for output to the occupant in the interior of an isolation pod.

The method 1800 may further include outputting, by the one or more processors, the digital content to the at least one output device. The outputting may be by various modes discussed in connection with the isolation pod 1605. For example, the method 1800 may include outputting, by the one or more processors, a signal for driving an immersive display on walls of the apparatus surrounding at least a portion of the passenger seat.

In some embodiments, the method 1800 may include configuring, by the one or more processors, the signal for least one of placing simultaneous action on adjacent panels or time coordinating past, present and future action scrolling across adjacent panels of the walls. In another aspect, the method 1800 may include controlling, by the one or more processors, at least one of a motion isolation system interposed between the passenger seat and the enclosure, a motion simulation system interposed between the passenger seat and the enclosure, and an output port for a tactile output device for use by the occupant.

In some embodiments, the method may include comprising controlling, by the one or more processors, an aroma generator responsive to at least a portion of the digital content. In another aspect, the method 1800 may include controlling, by the one or more processors, transparency of at least one wall of the enclosure. For example, in response to user input, the processor may open or close an electro-mechanical or solid-state shutter 1662 to admit or block light. In an alternative, the processor may enable an avatar of another user, or other object of interest, to be rendered and output in the isolation pod.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), televisions, digital projectors, smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device (PLD) or complex PLD (CPLD), discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-ray™ or other format), smart cards, and flash memory devices (e.g., card, stick, or other format). Of course, those skilled in the art will recognize many modifications may be made to this configuration without departing from the scope of the disclosed aspects. Thus, the system methods described herein may be embodied in any computer-readable medium for use by or in connection with an instruction execution system, apparatus, or device, such as a computer-based system, processor-containing system, or other system that fetches the instruction execution system, apparatus or device, and execute the instructions. A computer-readable medium may be any device or apparatus that stores, communicates, propagates, or transports a program for use by or in connection with the instruction execution system, apparatus, or device. For example, non-transitory computer-readable medium may be an electronic, magnetic, optical, electromagnetic, infrared, or semiconductor system, apparatus, device, or other storage medium known in the art or yet to be developed.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. For example, process descriptions or blocks in flowcharts and block diagrams presented herein may be understood to represent modules, segments, or portions of code or logic, which include one or more executable instructions for implementing specific logical functions or steps in the associated process. Alternative implementations are included within the scope of the present disclosure in which functions may be executed out of order from the order shown or described herein, including substantially concurrently or in reverse order, depending on the functionality involved, as would be understood by those reasonable skilled in the art after having become familiar with the teachings of the present disclosure. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A computer-implemented method for providing entertainment experiences in a moving vehicle, the computer-implemented method comprising: receiving, by one or more processors, a trip initiation indicator for a trip with a vehicle and one or more passengers, wherein the trip initiation indicator corresponds to starting an engine of the vehicle, detecting movement of the vehicle, and/or user input;

receiving, by the one or more processors, vehicle trip information corresponding to the trip initiation indicator, wherein the vehicle trip information includes an origin, a destination, one or more points of interest along a trip route, a trip purpose, a vehicle location, and/or a trip context;

selecting, by the one or more processors, a program for non-navigational social interaction during the trip, wherein the selecting is based on biometric sensor data that includes an emotional state indicator of the one or more passengers, wherein the emotional state indicator corresponds to an emotional category of an external intended target response type, and wherein the external intended target is external to the vehicle;

executing, by the one or more processors, the program for the non-navigational social interaction in synchrony with progress of the trip;

based on the executing, receiving, by the one or more processors, updated trip data that corresponds to the progress of the trip, and wherein the updated trip data includes a current location and/or a current event of the vehicle; and based on the updated trip data, outputting, by the one or more processors, human-perceivable interactive social behavior related to the trip on one or more output devices.

2. The computer-implemented method of claim 1, the computer-implemented method further comprising:
adapting the program for the non-navigational social interaction to be responsive to vehicle data, wherein the vehicle data includes vehicle trip progress data, vehicle expected arrival time, trip data, and/or vehicle state data.

3. The computer-implemented method of claim 1, wherein the program for the non-navigational social interaction includes one or more social networking applications and/or one or more multiplay audio and video games.

4. The computer-implemented method of claim 1, wherein the selecting is based on sensing and/or receiving trip initiation information, wherein the trip initiation information includes a vehicle status, the vehicle location, a passenger condition, and/or a passenger location.

5. The computer-implemented method of claim 1, wherein the user profile data includes user past and present affinities, one or more social trends, one or more user social trends, one or more user demographic attributes, and/or user membership status in a real group or a virtual group.

6. The computer-implemented method of claim 1, wherein the human-perceivable interactive social behavior includes speech, and wherein the human-perceivable interactive social behavior is outputted via an audio signal sent to an audio transducer of a content player device of the vehicle.

7. The computer-implemented method of claim 1, wherein the human-perceivable interactive social behavior includes one or more facial expressions and/or body language, and wherein the human-perceivable interactive social behavior is outputted via a video signal sent to an electronic screen display of a content player device.

8. The computer-implemented method of claim 7, wherein the human-perceivable interactive social behavior is outputted via a motor control signal sent to a motorized armature of the content player device.

9. The computer-implemented method of claim 1, wherein the emotional state indicator corresponds to a facial expression, a skin temperature, a pupil dilation, a respiration rate, a muscle tension, nervous system activity, or a pulse rate.

10. A computer system for providing entertainment experiences in a moving vehicle the computer system comprising:
at least one memory storing instructions; and
at least one processor configured to execute the instructions to perform operations comprising:
receiving, by the at least one processor, a trip initiation indicator for a trip with a vehicle and one or more passengers, wherein the trip initiation indicator corresponds to starting an engine of the vehicle, detecting movement of the vehicle, and/or user input;
receiving, by the at least one processor, vehicle trip information corresponding to the trip initiation indicator, wherein the vehicle trip information includes an origin, a destination, one or more points of interest along a trip route, a trip purpose, a vehicle location, and/or a trip context;
selecting, by the at least one processor, a program for non-navigational social interaction during the trip, wherein the selecting is based on biometric sensor data that includes an emotional state indicator of the one or more passengers, wherein the emotional state indicator corresponds to an emotional category of an external intended target response type, and wherein the external intended target is external to the vehicle;
executing, by the at least one processor, the program for the non-navigational social interaction in synchrony with progress of the trip;
based on the executing, receiving, by the at least one processor, updated trip data that corresponds to the progress of the trip, and wherein the updated trip data includes a current location and/or a current event of the vehicle; and
based on the updated trip data, outputting, by the at least one processor, human-perceivable interactive social behavior related to the trip on one or more output devices.

11. The computer system of claim 10, the operations further comprising:
adapting the program for the non-navigational social interaction to be responsive to vehicle data, wherein the vehicle data includes vehicle trip progress data, vehicle expected arrival time, trip data, and/or vehicle state data.

12. The computer system of claim 10, wherein the program for the non-navigational social interaction includes one or more social networking applications and/or one or more multiplay audio and video games.

13. The computer system of claim 10, wherein the selecting is based on sensing and/or receiving trip initiation information, wherein the trip initiation information includes a vehicle status, the vehicle location, a passenger condition, and/or a passenger location.

14. The computer system of claim 10, wherein the user profile data includes user past and present affinities, one or more social trends, one or more user social trends, one or more user demographic attributes, and/or user membership status in a real group or a virtual group.

15. The computer system of claim 10, wherein the human-perceivable interactive social behavior includes speech, and wherein the human-perceivable interactive social behavior is outputted via an audio signal sent to an audio transducer of a content player device of the vehicle.

16. A non-transitory computer-readable medium containing instructions that, when executed by a processor, cause the processor to perform operations for dynamically managing electronic transactions of pet care services data, the operations comprising:
receiving a trip initiation indicator for a trip with a vehicle and one or more passengers, wherein the trip initiation indicator corresponds to starting an engine of the vehicle, detecting movement of the vehicle, and/or user input;
receiving vehicle trip information corresponding to the trip initiation indicator, wherein the vehicle trip information includes an origin, a destination, one or more points of interest along a trip route, a trip purpose, a vehicle location, and/or a trip context;
selecting a program for non-navigational social interaction during the trip, wherein the selecting is based on biometric sensor data that includes an emotional state indicator of the one or more passengers, wherein the emotional state indicator corresponds to an emotional category of an external intended target response type, and wherein the external intended target is external to the vehicle;
executing the program for the non-navigational social interaction in synchrony with progress of the trip;

based on the executing, receiving updated trip data that corresponds to the progress of the trip, and wherein the updated trip data includes a current location and/or a current event of the vehicle; and based on the updated trip data, outputting human-perceivable interactive social behavior related to the trip on one or more output devices.

17. The non-transitory computer-readable medium of claim 16, the operations further comprising:

adapting the program for the non-navigational social interaction to be responsive to vehicle data, wherein the vehicle data includes vehicle trip progress data, vehicle expected arrival time, trip data, and/or vehicle state data.

18. The non-transitory computer-readable medium of claim 16, wherein the program for the non-navigational social interaction includes one or more social networking applications and/or one or more multiplay audio and video games.

19. The non-transitory computer-readable medium of claim 16, wherein the selecting is based on sensing and/or receiving trip initiation information, wherein the trip initiation information includes a vehicle status, the vehicle location, a passenger condition, and/or a passenger location.

20. The non-transitory computer-readable medium of claim 16, wherein the user profile data includes user past and present affinities, one or more social trends, one or more user social trends, one or more user demographic attributes, and/or user membership status in a real group or a virtual group.

* * * * *